(12) United States Patent
Park et al.

(10) Patent No.: US 10,812,804 B2
(45) Date of Patent: Oct. 20, 2020

(54) IMAGE PROCESSING DEVICE AND IMAGE PROCESSING METHOD PERFORMING SLICE-BASED COMPRESSION

(71) Applicant: Samsung Electronics Co., Ltd., Suwon-si, Gyeonggi-do (KR)

(72) Inventors: Byeong-jo Park, Hwaseong-si (KR); Cho-rok Kwon, Suwon-si (KR); Sang-min Kim, Hwaseong-si (KR); Somraj Mani, Suwon-si (KR); Min-gyu Sim, Hwaseong-si (KR); Sung-min Chun, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 247 days.

(21) Appl. No.: 15/815,060

(22) Filed: Nov. 16, 2017

(65) Prior Publication Data

US 2018/0332293 A1 Nov. 15, 2018

(30) Foreign Application Priority Data

May 10, 2017 (KR) ........................ 10-2017-0058096

(51) Int. Cl.
*H04N 19/159* (2014.01)
*H04N 19/89* (2014.01)
*H04N 19/61* (2014.01)
*H04N 19/174* (2014.01)

(52) U.S. Cl.
CPC ......... *H04N 19/159* (2014.11); *H04N 19/174* (2014.11); *H04N 19/61* (2014.11); *H04N 19/89* (2014.11)

(58) Field of Classification Search
None
See application file for complete search history.

(56) References Cited

U.S. PATENT DOCUMENTS

| 5,745,180 A | 4/1998 | Kwon et al. |
| 8,189,684 B2 | 5/2012 | Hwang et al. |
| 8,520,730 B2 | 8/2013 | Kadono |

(Continued)

FOREIGN PATENT DOCUMENTS

| CN | 102413307 A | 4/2012 |
| CN | 102547375 A | 7/2012 |

(Continued)

OTHER PUBLICATIONS

Written Opinion from the Intellectual Property Office of Singapore dated Nov. 22, 2018 for corresponding Application No. 10201803184U.

*Primary Examiner* — Lindsay J Uhl
(74) *Attorney, Agent, or Firm* — Harness, Dickey & Pierce, P.L.C.

(57) ABSTRACT

Disclosed are an image processing device and an image processing method performing a slice-based compression. The image processing method includes applying a first compression method to some slices of a first frame image including first to N-th slices (N is an integer of 2 or greater) to generate an I-slice, applying a second compression method to the other slices of the first frame image to which the first compression was not applied to generate a plurality of P-slices, and transmitting less than N packets including the generated I-slice and the generated P-slices with respect to the first frame image.

19 Claims, 26 Drawing Sheets

(56) References Cited

U.S. PATENT DOCUMENTS

| | | | |
|---|---|---|---|
| 2001/0026677 A1 | 10/2001 | Chen et al. | |
| 2005/0259613 A1* | 11/2005 | Garudadri | H04L 29/06 370/328 |
| 2010/0054337 A1 | 3/2010 | Miyoshi | |
| 2010/0303153 A1 | 12/2010 | Kadono | |
| 2016/0065980 A1 | 3/2016 | Choi et al. | |
| 2016/0092298 A1 | 3/2016 | Grube et al. | |
| 2016/0100173 A1 | 4/2016 | McBrearty et al. | |
| 2016/0127215 A1 | 5/2016 | Mani et al. | |
| 2016/0127709 A1 | 5/2016 | Lewis et al. | |
| 2017/0105010 A1* | 4/2017 | Wu | H04N 21/8451 |

FOREIGN PATENT DOCUMENTS

| | | |
|---|---|---|
| CN | 102665140 A | 9/2012 |
| KR | 10-0799669 B1 | 1/2008 |
| KR | 10-1478243 B1 | 12/2014 |
| WO | WO-2014/107121 A1 | 7/2014 |

\* cited by examiner

IMAGE PROCESSING DEVICE AND IMAGE PROCESSING METHOD PERFORMING SLICE-BASED COMPRESSION

CROSS-REFERENCE TO RELATED APPLICATION

This U.S. non-provisional application claims the benefit of priority under 35 U.S.C. § 119 to Korean Patent Application No. 10-2017-0058096, filed on May 10, 2017, in the Korean Intellectual Property Office (KIPO), the disclosure of which is incorporated herein in its entirety by reference.

BACKGROUND

Various inventive concepts relate to an image processing device, system, method, and/or non-transitory computer readable medium. More particularly, various example embodiments are related to an image processing device performing slice-based compression, an image processing system performing slice-based compression, an image processing method for performing the slice-based compression, and a non-transitory computer readable medium storing computer readable instructions for the image processing method.

In general, an imaging processing device encodes an image to transmit and receive the coded image, thereby improving image transmission efficiency. Image compression can be applied using various codec technologies, and an inter-prediction that compresses an image with reference to an image in other areas (e.g., previous images and/or video frames, etc.), and an intra-prediction that compresses an image without reference to an image in other areas, may be applied as an example of the image compression method. For instance, based on a frame unit, a frame compressed by the inter-prediction is referred to as an I-frame, and a frame compressed by the intra-prediction is referred to as a P-frame or a B-frame.

An encoded image is transmitted to a receiver through a network having a restricted bandwidth. As described above, the frames are classified into the I-frame and P- and B-frames based on the compression method, and the I-frame has a relatively large size (or a relatively large capacity) compared to the P- and B-frames since it is required that the I-frame be decompressed without reference to a previous frame. However, in the case in which the I-frame having the relatively large capacity is transmitted through the network having the restricted bandwidth, the network usage amount increases, and the probability of transmission errors increases.

SUMMARY

Various example embodiments related to the inventive concepts provide an image processing device, image processing system, an image processing method, and/or a non-transitory computer readable medium, which equalize a usage amount of a network and reduce a probability of decoding errors.

According to an aspect of the inventive concepts, there is provided an image processing method including generating, using at least one processor, at least one I-slice by applying a first compression method to at least one slice of a first frame image comprising first to N-th slices, where N is an integer of 2 or greater, generating, using the at least one processor, a plurality of P-slices by applying a second compression method to the other slices of the first frame image, and transmitting, using the at least one processor, less than N packets to an image receiving device, the less than N packets comprising the generated at least one I-slice and the generated P-slices with respect to the first frame image.

According to another aspect of the inventive concepts, there is provided an image processing method, in which one frame image comprises N slices, where N is an integer of 2 or greater, and in which a period, during which I-slices associated with the N slices are transmitted, the method including selecting, using at least one processor, N frame sections among a plurality of frame sections included in the period, generating, using the at least one processor, the I-slices associated with the N slices, distributing, using the at least one processor, the generated I-slices in the selected N frame sections, and generating, using the at least one processor, a first packet comprising one of the generated I-slices and a second packet comprising a plurality of P-slices in each of the selected N frame sections.

According to another aspect of the inventive concepts, there is provided an image processing device including a memory having computer readable instructions stored thereon, and at least one processor configured to execute the computer readable instructions to receive a first frame image, generate an I-slice based on a first compression method, and a plurality of P-slices based on a second compression method from a plurality of slices included in the first frame image, allocate the I-slice and the P-slices among a plurality of packets, and generate the plurality of packets based on the allocated I-slice and the allocated P-slices wherein the plurality of packets are less than a number of the slices.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
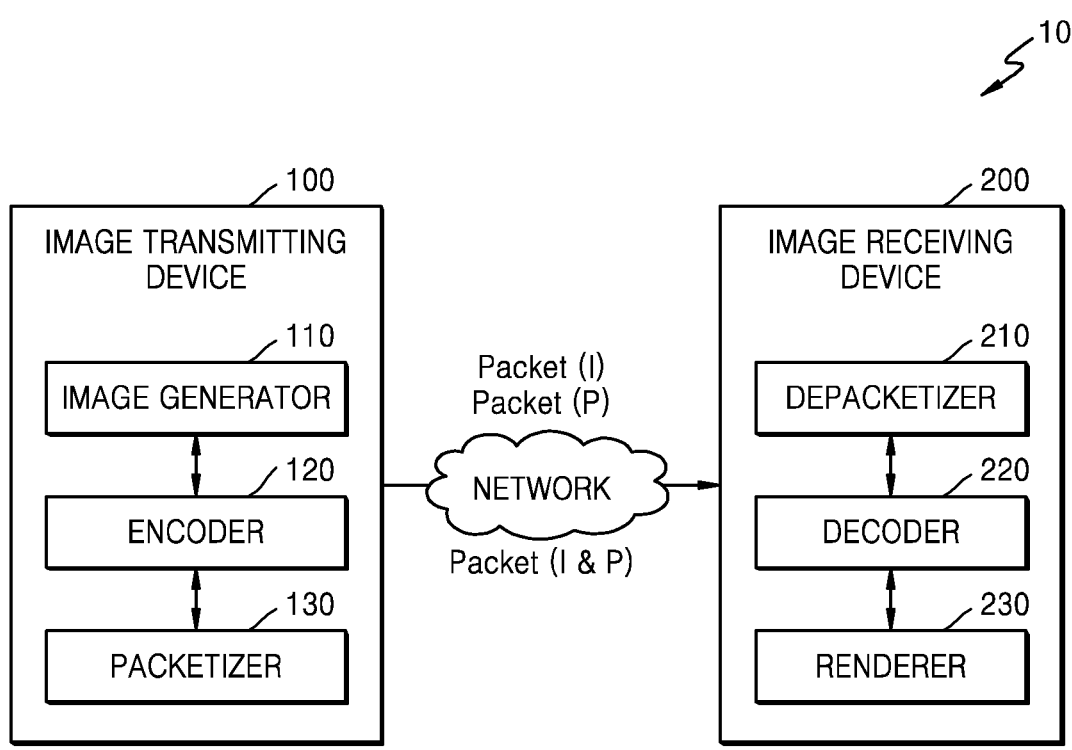
FIG. 1 is a block diagram showing an image processing system including an image processing device according to at least one example embodiment.

Reference will now be made in detail to various example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects.

FIG. 1 is a block diagram showing an image processing system including an image processing device according to at least one example embodiment. An image processing system 10 shown in FIG. 1 may include an image transmitting device 100 and an image receiving device 200 as the image processing device according to at least one example embodiment. As another example, the image processing device according to at least one example embodiment may include a function of transmitting and receiving an image, and thus the image processing device may correspond to the image processing system 10.

The image processing system 10 may correspond to various systems. As an example, the image transmitting device 100 and the image receiving device 200 may transmit and receive information including an image to and from each other via a wireless and/or wired network. In a case that the image processing system 10 is a wireless communication system, each of the image transmitting device 100 and the image receiving device 200 may be a terminal, such as a smartphone, a tablet, a handheld camera, an Internet of Things (IoT) device, etc., that encodes the image and transmits the encoded image to a base station, or decodes the image provided from (e.g., received from) the base station. As another example, the image processing system 10 may be various types of network systems, e.g., an internet broadcast system, an IPTV system, the Internet, a satellite network, a cellular network, a radio network, etc.

The image transmitting device 100 may perform an encoding operation including a compression operation with respect to the image according to at least one example embodiment. As an example, the image transmitting device 100 may perform the encoding operation based on various image formats (e.g., image compression formats, image file formats, etc.), such as, MPEG, H.264/AVC, VP8, HEVC, etc. As an example of the encoding operation, the image compression operation may be performed on a desired (and/or predetermined) unit of an image (e.g., a frame image), and the frame image may be compressed based on an inter-prediction and/or an intra-prediction technique(s). In the case that the frame image is compressed based on the intra-prediction, a current frame image may be compressed without reference to a previous frame image, and in the case that the frame image is compressed based on the inter-prediction, the current frame image may be compressed with reference to one or more previous frame images.

As described above, the frame image may be compressed using various methods, and an I-frame may be generated by the compression performed based on the intra-prediction, wherein the I-frame may correspond to a reference frame that is used to decode another frame. An operation of decompressing the compressed image may be performed based on the compression method used to compress the image. As an example, the image receiving device 200 may decode the I-frame without reference to another frame, but the compressed frame image (e.g., a P-frame) compressed by the inter-prediction may be decoded with reference to another I-frame and/or the P-frame. The image transmitting device 100 may transmit the encoded image in the form of, for example, streaming video to the image receiving device 200, but the example embodiments are not limited thereto. In a case in which the I-frame has a relatively large size when compared to the P-frame has been transmitted, the image quality of the, for example, streaming video may deteriorate and/or transmission of the image (and/or video) may fail due to the increase in bandwidth required to transmit the image (and/or video).

According to at least one example embodiment, the image transmitting device 100 may include an image generator 110, an encoder 120, and a packetizer 130, but is not limited thereto. In addition, the image receiving device 200 may include a depacketizer 210, a decoder 220, and a renderer 230, etc. The image generator 110 may include a device, e.g., a camera, to generate raw data (e.g., raw image data). However, according to at least one other example embodiment, the image transmitting device 100 may receive an image from the outside (e.g., an external source, such as a separate computer, etc.) and transmit the image to the encoder 120.

The encoder 120 may perform the encoding operation based on various image standards. As described above, the encoder 120 may compress the frame image based on the inter-prediction and/or the intra-prediction. In addition, the encoder 120 may divide one frame image into a plurality of areas (e.g., slices), perform the compression on the frame image in units of slices, and provide the compressed slice to the packetizer 130. The packetizer 130 may perform a variety of packetization operations according to various example embodiments on the compressed slice, and transmit at least one packet to the image receiving device 200 through a network.

Meanwhile, the image receiving device 200 may process the image by performing the processing operations performed in the image transmitting device 100 in reverse order. For example, the depacketizer 210 may extract an actual information portion (e.g., payload) from the packet received through the network and provide the extracted information to the decoder 220. The decoder 220 may decompress the slices by performing a decoding operation associated with the encoding and/or compression method used to compress the slices using the provided information to decompress the frame image, and provide the decompressed frame image to the renderer 230. The renderer 230 may display the image on a screen using the decompressed frame image provided from the decoder 220.

When the compression is performed on the units of slices, slices compressed without reference to a slice of another frame image may be referred to as I-slices, and slices compressed with reference to a slice of another frame image may be referred to as P-slices or B-slices. The P-slice may be a slice compressed with reference to a slice of one or more previous frames, and the B-slice may be a slice compressed with reference to a slice of one or more previous and forward (e.g., future) frames. Hereinafter, only example embodiments of transmitting the I-slice and the P-slice will be described for the sake of brevity, but the image transmitting device 100 may transmit the I-slice, the P-slice, and the B-slice according to various example embodiments.

Figure 4A:
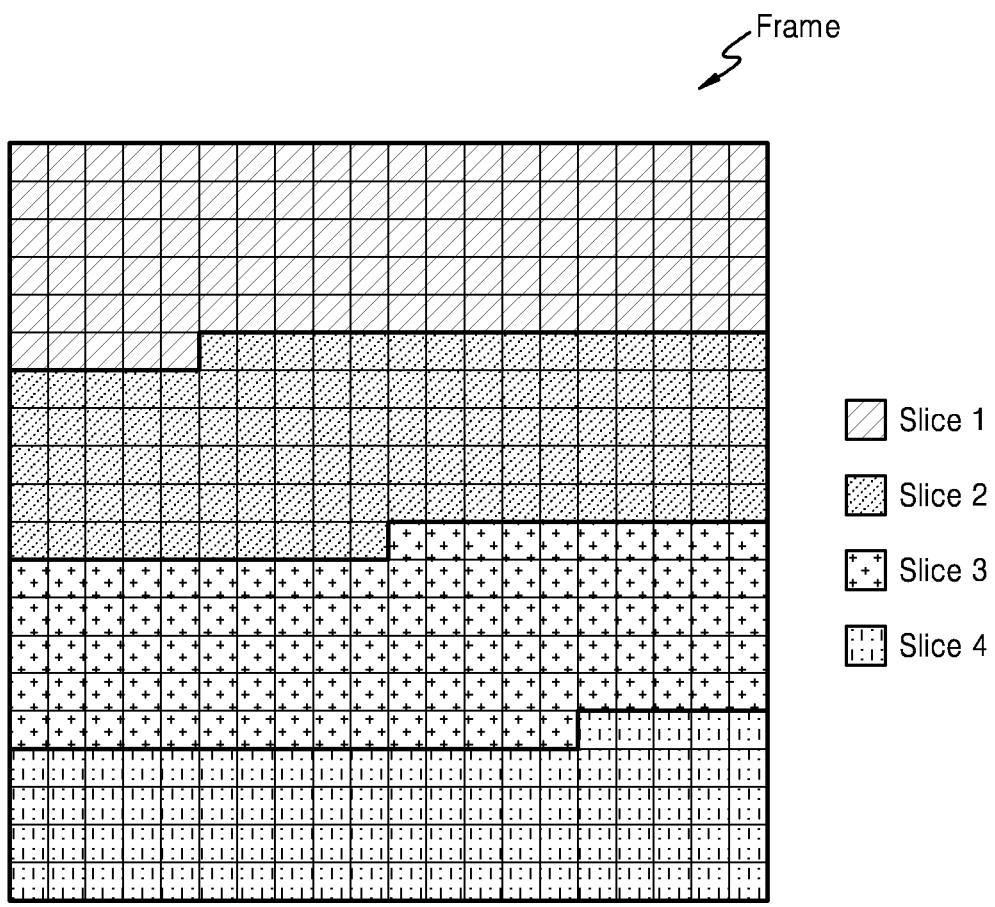
FIGS. 4A and 4B are views respectively showing an example in which one frame image is divided into a plurality of slices and an example of transmitting frames according to some example embodiments.
Figure 4B:
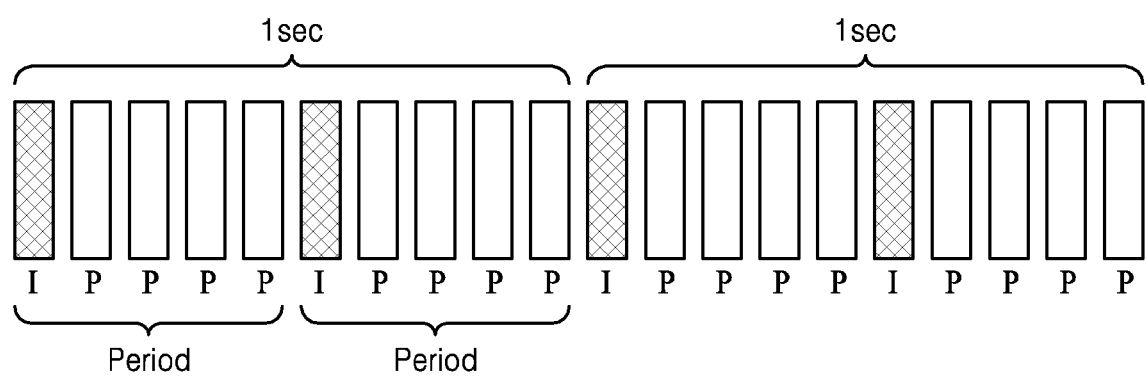

FIGS. 4A and 4B are views respectively showing an example in which one frame image is divided into slices and an example of transmitting frames according to some example embodiments.

Referring to FIG. 4A, a maximum transmission unit (MTU) in a network, such as an Ethernet environment, etc., may be restricted to a desired and/or predetermined size (e.g., about 1500 bytes), and a payload excluding an TCP/IP-related and/or RTP-related header which is necessary to transmit the packet based on the transmission protocol used, may have a size in a range from about 1200 bytes to about 1440 bytes. The one frame image may be divided into slices while taking into account a network state and a size of the compressed image. As an example, FIG. 4A shows an example in which the one frame image is divided into first, second, third, and fourth slices Slice 1, Slice 2, Slice 3, and Slice 4, but the example embodiments are not limited thereto.

The compression operation may be performed on the frame image in units of slices, and each of the first to fourth slices Slice 1 to Slice 4 may be classified as the I-slice or the P-slice based on the compression method applied to the frame image. For example, the I-slice corresponds to a slice compressed without reference to a slice of another frame image, and the P-slice corresponds to a slice compressed with reference to a slice of another frame image. As an example, a specific slice of the frame image may be compressed with reference to a slice (I-slice and/or P-slice) positioned at the same position in the previous frame. For instance, in a case that the second slice Slice 2 is compressed to be the P-slice, the second slice Slice 2 may be compressed or decompressed using a second slice of one or more previous frames.

Meanwhile, FIG. 4B shows an example in which a plurality of frames are transmitted in a 10 FPS (frames per second) environment, but the example embodiments are not limited thereto and may use different FPS settings. The I-frame may be periodically transmitted at desired and/or predetermined intervals. In FIG. 4B, first and sixth frames among ten frames transmitted during one second correspond to the I-frame (e.g., the first and sixth frames may be compressed as I-frames), but the example embodiments are not limited thereto. As an example, the I-frame may be transmitted three or more times during one second, or the I-frame may be transmitted only one time during one second, etc.

Meanwhile, a period (e.g., an I-frame period) in which the I-frame is transmitted may be defined. In FIG. 4B, the I-frame period may be about 0.5 seconds since the I-frame is transmitted two times during one second, however the example embodiments are not limited thereto. As described above, in the case that the one frame image includes first to fourth slices Slice 1 to Slice 4, the first to fourth slices Slice 1 to Slice 4 are each compressed as the I-slice, and may be desired and/or required to be transmitted at least once in the I-frame period.

Referring to FIG. 1, in order to reduce a bandwidth usage increase of the network and a probability of transmission failure of the I-frame resulting from and/or associated with the bandwidth usage increase when the I-frame having the relatively large size is transmitted, the image transmitting device 100 may generate a packet Packet(I) including the I-slice and a packet Packet(P) including the P-slice based on the one frame image and transmit the generated packets Packet(I) and Packet(P) to the image receiving device 200. As an example, when a section in which one frame being transmitted is defined as a frame section in FIG. 4B, the packet Packet(I) including the I-slice and the packet Packet (P) including the P-slice may be generated together in one frame section. For instance, in FIG. 4A, the first slice Slice1 may be compressed as the I-slice, and each of the second to fourth slices Slice 2 to Slice 4 may be compressed as the P-slice. In addition, the image transmitting device 100 may generate a packet Packet(I&P) including the I-slice (e.g., Slice1) and the P-slices (e.g., Slice 2 to Slice 4) according to at least one example embodiment.

In addition, according to some example embodiments, the first to fourth slices Slice 1 to Slice 4 may each correspond to the I-slice (e.g., be compressed as I-slices), and may be transmitted once in one I-frame period. According to at least one example embodiment, the I-slices may be generated in different frame sections from each other within one I-frame period Period with respect to the first to fourth slices Slice 1 to Slice 4. In other words, the first slice Slice 1 may be compressed as the I-slice in a first frame section, a second slice Slice 2 may be compressed as the I-slice in a second frame section, and each of the third slice Slice 3 and the fourth slice Slice 4 may be compressed as the I-slice in several frame sections selected from the remaining frame sections.

According to at least one example embodiment, the packetizer 130 may packetize the generated I-slice and the generated P-slice in various ways. The packetizer 130 may generate the packet including one slice or generate a packet including two or more slices. As an example, the packetizer 130 may generate the packet Packet(I) including one I-slice with respect to one frame image and generate the packet Packet(P) including a plurality of P-slices generated with respect to the remaining slices of the one frame image.

According to the aforementioned example embodiment, a phenomenon in which bandwidth rapidly increases in a specific frame section may be improved, and an error in transmission (e.g., transmission failure, packet loss, data corruption of the packet being transmitted, etc.) of the image may be reduced. In addition, the number of packets generated with respect to the one frame image may be controlled. For instance, the number of the packets may be decreased and/or minimized, and thus the amount (e.g., size) of total information (e.g., data—including the data associated with the required packet headers) transmitted through the network may be reduced.

Figure 2:
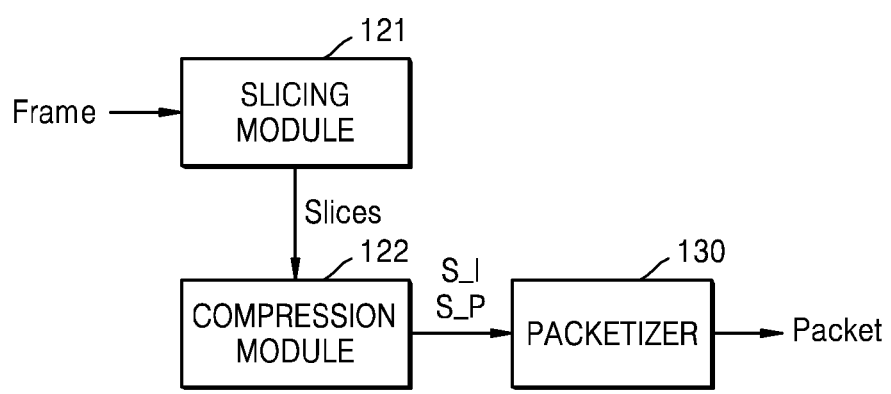
FIG. 2 is a block diagram showing an image transmitting device of FIG. 1 according to at least one example embodiment.

FIG. 2 is a block diagram showing an example of the image transmitting device 100 of FIG. 1 according to at least one example embodiment.

Referring to FIGS. 1 and 2, the image transmitting device 100 may include a slicing module 121, a compression module 122, and the packetizer 130, but is not limited thereto. The slicing module 121 and the compression module 122 may be included in the encoder 120 shown in FIG. 1 according to at least one example embodiment. Each of the slicing module 121, the compression module 122, and the packetizer 130 may be implemented in hardware. As another example, each of the slicing module 121, the compression module 122, and the packetizer 130 may be implemented by a combination of the hardware and the software (e.g., a processing device executing computer readable instructions). In the case that elements shown in FIG. 2 are implemented in software, a memory (e.g., a working memory) stores programs that cause at least one processor to perform functions of the modules and the packetizer may be provided in the image transmitting device 100, and the processor(s) (not shown) may execute the programs stored in the memory to perform the functions of the elements shown in FIG. 2.

The slicing module 121 receives a frame image Frame and divides the frame image Frame into slices Slices. The compression module 122 receives the slices Slices and compresses the frame image Frame in units of slices. The compression module 122 may provide I-slice S_I and/or P-slice S_P to the packetizer 130 according to desired compression methods.

The packetizer 130 may generate a packet Packet including the I-slice S_I and/or the P-slice S_P. In addition, the packetizer 130 may control a type and number of the slices included in each packet Packet. Functions of the compression operation and the packetization operation shown in FIG. 2 may be implemented in hardware or a combination of hardware and software in the image transmitting device 100.

Figure 3:
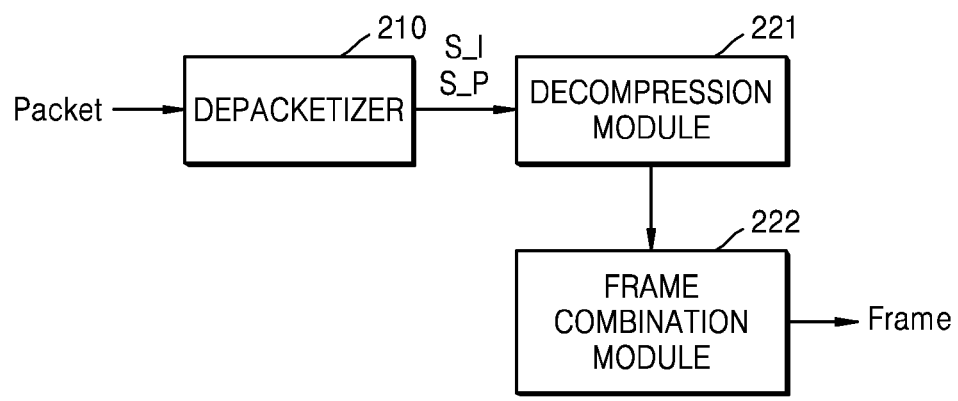
FIG. 3 is a block diagram showing an image receiving device of FIG. 1 according to at least one example embodiment.

FIG. 3 is a block diagram showing an example of the image receiving device 200 of FIG. 1 according to at least one example embodiment.

Referring to FIG. 3, the image receiving device 200 may include the depacketizer 210, a decompression module 221, and a frame combination module 222, but is not limited thereto. The decompression module 221 and the frame combination module 222 may be provided in the decoder 220 of FIG. 1. The depacketizer 210 may extract the I-slice S_I and/or the P-slice S_P from a payload area included in the packet Packet and provide the extracted I-slice S_I and/or the extracted P-slice S_P to the decompression module 221. The decompression module 221 may decompress the slices Slices through the decompression operation and provide the slices Slices decompressed according to the decompression operation to the frame combination module 222. The frame combination module 222 may combine the slices Slices with each other to generate an original frame image Frame.

Hereinafter, an image transmission method according to at least one example embodiment will be described.

Figure 5:
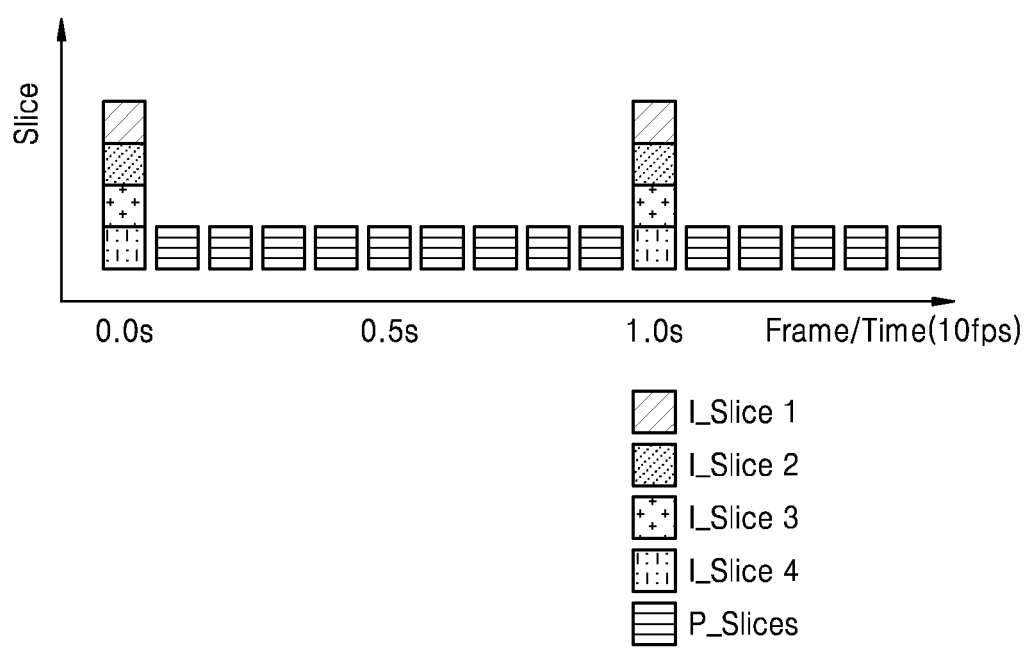
FIG. 5 is a view showing a conventional image transmission method.

FIG. 5 is a view showing a conventional image transmission method. In the graph shown in FIG. 5, the horizontal axis is a time axis (or a frame axis), and the vertical axis is an axis for indicating the slices transmitted in each frame section. In addition, in FIG. 5, the image is transmitted based on 10 FPS, and one I-frame is transmitted every second.

Referring to FIG. 5, a frame image may be divided into a plurality of slices (e.g., four slices), and the I-slice and the P-slice may be generated by performing a compression operation on the frame image in units of slices. In the frame section in which the I-frame is transmitted, four I-slices are generated from one frame image and transmitted. As described in FIG. 5, each of the I-slices may have a size larger than that of the P-slice. Meanwhile, in the frame section in which the P-frame is transmitted, four P-slices are generated from one frame image and transmitted.

In the conventional image transmission method shown in FIG. 5, each I-slice is transmitted while being included in a separate packet during the frame section in which the I-frame is transmitted, and the bandwidth usage rapidly increases in order to support the transmission of the four I-slices, that is, to transmit four packets containing the larger amount of data associated with the four I-slices. Among the four packets including the I-slices, one or more packets may fail to be transmitted due to the rapid bandwidth usage increase, and in this case, the decompression performance with respect to a subsequent P-frame decompressed with reference to the I-frame may deteriorate.

Hereinafter, an image processing operation according to some example embodiments will be described. For the convenience of explanation, the term "slice" may be used as a term indicating a slice before compression processing or the slice after compression processing. In addition, a first slice compressed based on a first method (e.g., the intra-prediction) may be referred to as a "first I-slice". Further, a second slice compressed based on a second method (e.g., the inter-prediction) may be referred to as a "second P-slice".

Figure 6A:
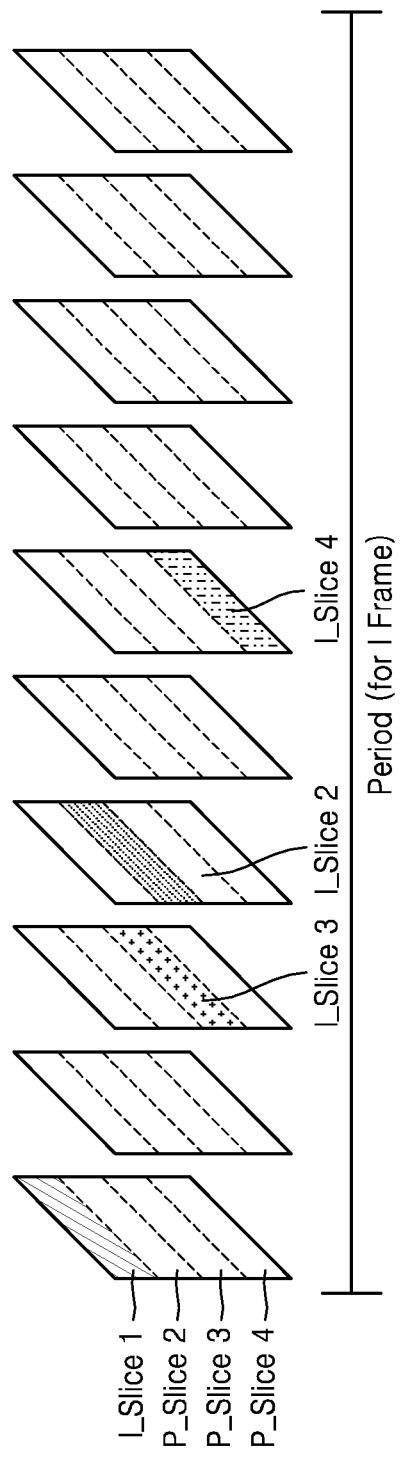
FIGS. 6A and 6B are views each showing an image transmission method according to at least one example embodiment.
Figure 6B:
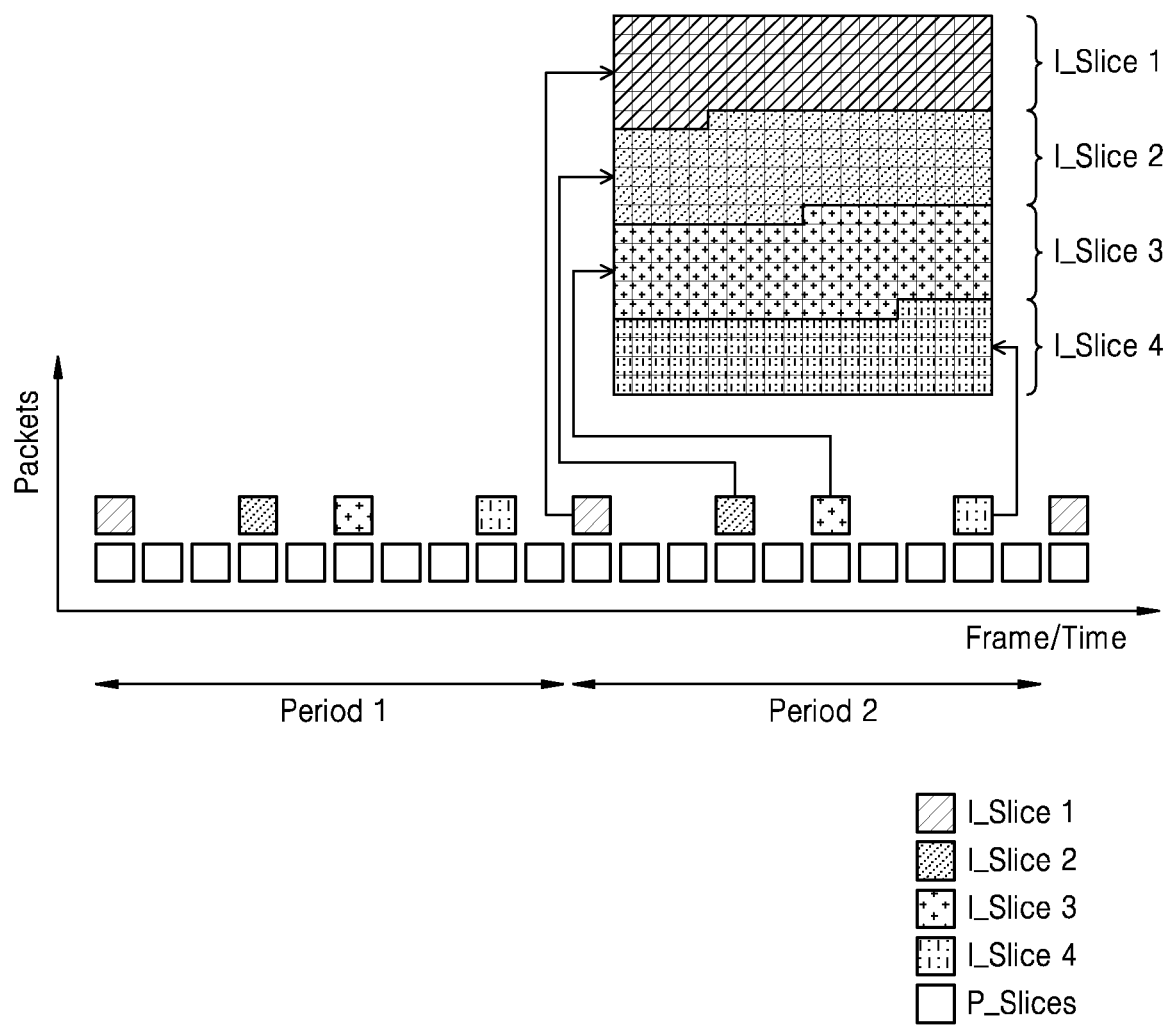

FIGS. 6A and 6B are views showing an image transmission method according to at least one example embodiment. In FIGS. 6A and 6B, it is assumed that the I-frame period Period corresponds to ten frames and each of the frames is divided into four slices, but the example embodiments are not limited thereto, with the image may be transmitted in various ways without being limited thereto and the frames may be divided into two or more slices.

Referring to FIG. 6A, each of the first, second, third, and fourth I-slices I_Slice 1, I_Slice 2, I_Slice 3, and I_Slice 4 may be generated once in one I-frame period Period. In addition, the first to fourth I-slices I_Slice 1 to I_Slice 4 may be distributed and generated in different frame sections of the one I-frame period Period. As an example, the first I-slice I_Slice 1 is generated in a first frame section, the second I-slice I_Slice 2 is generated in a fourth frame section, the third I-slice I_Slice 3 is generated in a third frame section, and the fourth I-slice I_Slice 4 is generated in a sixth frame section.

That is, according to at least one of the aforementioned example embodiments, since the I-slices I_Slice 1 to I_Slice 4 used to represent one picture are distributed and generated at different times (and/or different frame sections) instead of being generated at the same time, the bandwidth usage may become uniform in the whole frame section, and thus network occupancy characteristics may be improved.

Meanwhile, the I-slices and the P-slices generated as described above may be transmitted in various ways. FIG. 6B shows an example in which one I-slice is generated in each of the first, fourth, sixth, and ninth frame sections when the I-slices I_Slice 1 to I_Slice 4 used to represent the one picture are generated and distributed in several frame sections. In addition, to further describe packets generated according to at least one example embodiment, the vertical axis of the graph of FIG. 6B indicates the number of packets transmitted.

The first to fourth I-slices I_Slice 1 to I_Slice 4 may be distributed and generated in the several frame sections, and the packetization operation may be performed in different ways in each frame section based on the distribution and generation. As an example, the number of the packets transmitted in each frame section may be smaller than the number of the slices included in the frame image. In addition, the number of the packets generated in the frame section in which the I-slice is transmitted may be greater than the number of the packets generated in the frame section in which the P-slice is transmitted. For instance, in the first frame section in which the I-slice is transmitted, the packet including the first I-slice I_Slice 1, and the packet including the remaining three P-slices P_Slices, may be transmitted. Additionally, in the frame section (e.g., the second frame section) in which the I-slice is not transmitted, four P-slices P_Slice may be generated from the frame image, and one packet (e.g., a single packet) including the four P-slices P_Slice may be transmitted.

Then, packets may be transmitted in the same way as in the first period Period 1 during another I-frame period (e.g., a second period Period 2). According to at least one example embodiment, a position of the frame section in which the I-slice is generated within one I-frame period may be predetermined and may not be changed, or the position of the frame section in which the I-slice is generated may be changed with one or more, or every I-frame period. In addition, according to at least one example embodiment, the four P-slices P_Slice are included in one packet in the frame section in which the I-slice is not transmitted, but the four P-slices P_Slice may be included in two or more packets after being divided. That is, two or more packets may be transmitted in the frame section in which the P-slices P_Slice are transmitted.

In the above-mentioned example embodiment, one I-slice is generated in one frame, but the example embodiments are not be limited thereto. For instance, two or more I-slices may be generated in consideration of and/or based on the bandwidth of the network. In a case where one frame is divided into N slices, less than N I-slices may be generated in one frame section. In a case where one frame is divided into many slices, each slice having a small size, two or more I-slices may be generated in one frame section when the I-slices are distributed to the frame sections.

In this case, as in at least one of the above-described example embodiments, various packetization operations may be performed on the I-slices and the P-slices which are generated in the one frame image. As an example, the I-slices may be included in one packet in the one frame image or the I-slices may be respectively included in separate packets in the one frame image. In addition, the generated P-slices may be included in one or more packets.

Figure 7A:
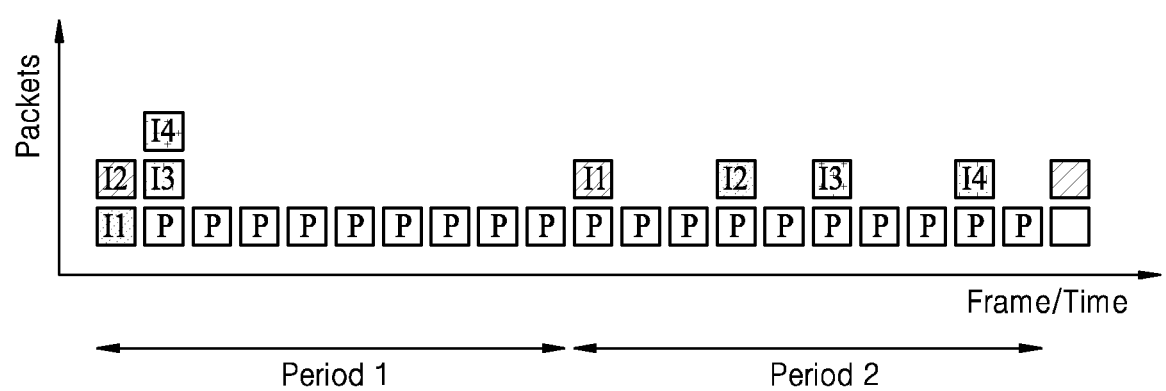
FIGS. 7A, 7B, and 8 are views showing various image transmission methods according to some example embodiments.
Figure 7B:
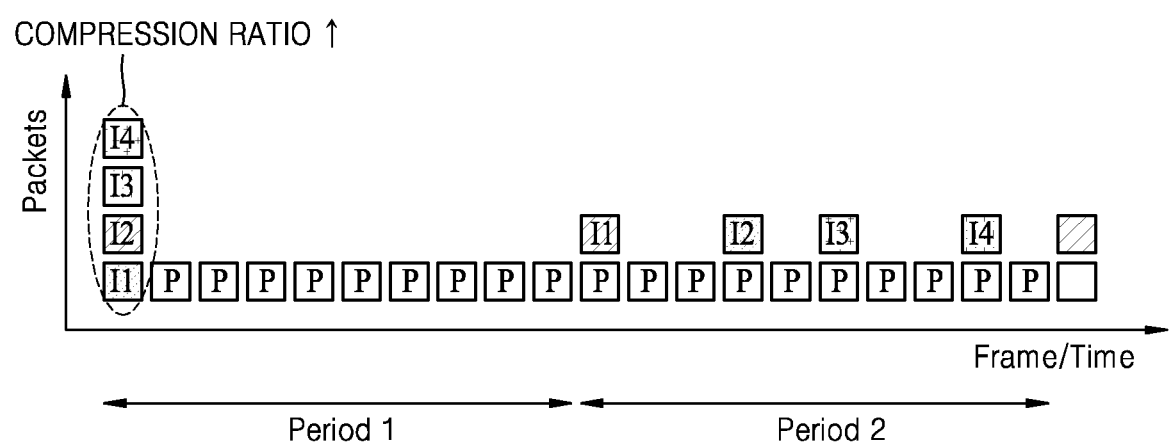
Figure 8:
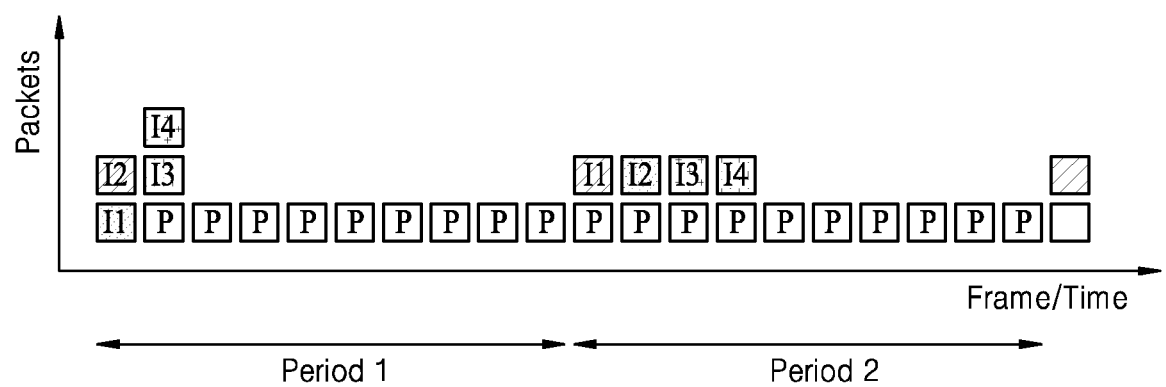

FIGS. 7A, 7B, and 8 are views showing various image transmission methods according to some example embodiments. In the following example embodiments, it is assumed that the I-frame period Period corresponds to ten frames, each frame is divided into four slices, and the P-slices (e.g., four P-slices forming one frame) are included in one packet, but as described above, the example embodiments are not limited thereto and various other transmission methods and/or compression methods may be applied.

When video streaming starts, at least one reference frame needs to be transmitted first, and thus the I-slices desired and/or required to represent the one picture (e.g., the reference frame(s)) need to be transmitted as early as possible. Referring to FIG. 7A, first, second, third, and fourth I-slices I1, I2, I3, and I4 used to represent the one picture may be transmitted in one or more initial frame sections of an initial I-frame period Period 1. For instance, the first and second I-slices I1 and I2 may be transmitted in a first frame section, and the third and fourth I-slices I3 and I4 may be transmitted in a second frame section, but the example embodiments area not limited thereto.

According to at least one example embodiment, only the first and second I-slices I1 and I2 may be selectively generated from the frame image and transmitted in the first frame section. Then, the third and fourth I-slices I3 and I4 may be generated and transmitted in the second frame section. As an example, in the second frame section, first and second P-slices P may be generated with reference to the I-slices transmitted in the first frame section and transmitted along with the third and fourth I-slices I3 and I4.

As a variable example embodiment, all of the first to fourth I-slices I1 to I4 may be generated from the frame image in the first frame section and transmitted. According to the example embodiment shown in FIG. 7A, the first and second I-slices I1 and I2 are first transmitted by taking into account the bandwidth of the network, and the first and second I-slices I1 and I2, which are first transmitted, are successfully transmitted, but the third and fourth I-slices I3 and I4, which are transmitted later, may fail to be successfully transmitted to the receiving device. Similarly, the third and fourth I-slices I3 and I4 may be transmitted prior to the first and second I-slices I1 and I2 in the second frame section.

Then, the P-slices P may be generated, respectively, from the frame images in the remaining frame sections of the initial I-frame period Period 1, and the I-slices I1 to I4 may be transmitted when a next I-frame period Period 2 starts. For instance, as in the above-described example embodiment, the first to fourth I-slices I1 to I4 used to represent the one picture may be distributed and generated in different frame sections from each other. In FIG. 7A, the first to fourth I-slices I1 to I4 are non-consecutively distributed and generated in the frame sections. For instance, the first to fourth I-slices I1 to I4 may be generated and distributed in first, fourth, sixth, and ninth frame sections.

Meanwhile, FIG. 7B shows a variable example embodiment, and all the first to fourth I-slices I1 to I4 used to represent the one picture may be transmitted in the first frame section of the initial I-frame period Period 1 so that at least one reference frame is transmitted in a desirable and/or preferential manner when the video streaming starts. In transmitting all of the first to fourth I-slices I1 to I4 in the one frame section, a compression ratio of the first to fourth I-slices I1 to I4 may be set to a large value by taking into account the bandwidth of the network. In this case, since each of the first to fourth I-slices I1 to I4 may be compressed without reference to another slice and based on a compression ratio set by taking into account the bandwidth, a probability of transmission failure may be reduced.

Then, the P-slices P may be generated, respectively, from the frame images in the remaining frame sections of the initial I-frame period Period 1, and the first to fourth I-slices I1 to I4 may be distributed to the frame sections while being transmitted when the next I-frame period Period 2 starts as described in at least one of the previous example embodiments.

Meanwhile, referring to FIG. 8, when the first to fourth I-slices I1 to I4 are distributed and generated in the frame sections, the first to fourth I-slices I1 to I4 may be distributed to consecutive frame sections while being transmitted. In the example embodiments described with reference to FIGS. 7A and 7B, the first to fourth I-slices I1 to I4 may be distributed non-consecutively throughout the frame sections in accordance with a desired and/or predetermined interval while being transmitted, and the increase of the bandwidth may be uniform over the entire I-frame period.

Additionally, according to the at least one example embodiment shown in FIG. 8, the first to fourth I-slices I1 to I4 are distributed to four initial frame sections of the next I-frame period Period 2 while being transmitted. In this case, the first to fourth I-slices I1 to I4 used to represent the one picture in each I-frame period may be transmitted as fast as possible. In the above-described example embodiment of FIG. 8, all of the first to fourth I-slices I1 to I4 are transmitted in consecutive frame sections, however, a transmission timing of the first to fourth I-slices I1 to I4 may be set to allow only a portion of the first to fourth I-slices I1 to I4 to be transmitted in the consecutive frame sections.

Figure 9:
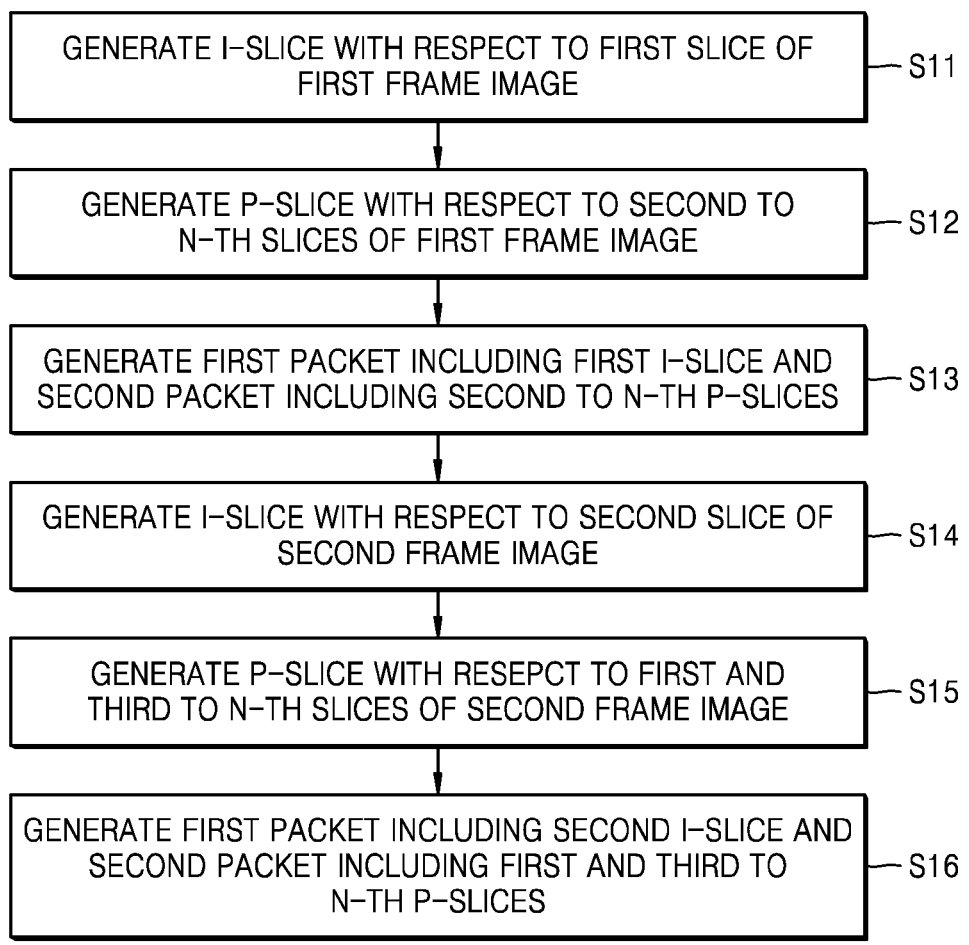
FIGS. 9 and 10 are flowcharts showing an image processing method according to some example embodiments.
Figure 10:
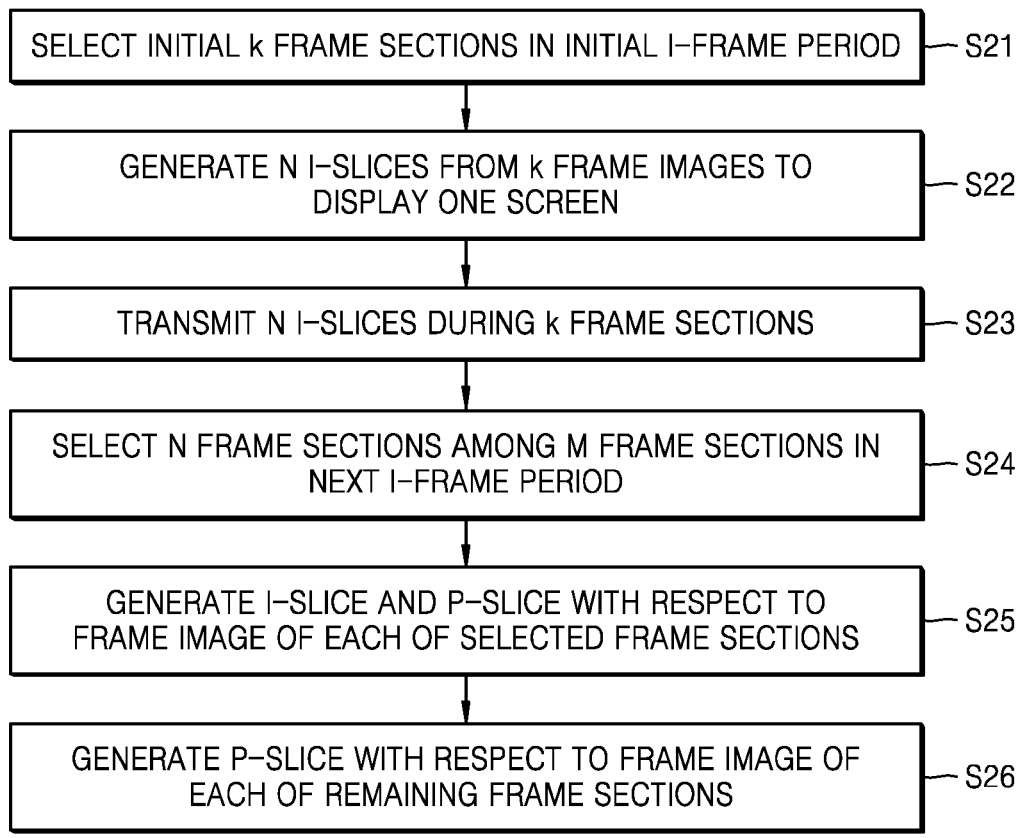

FIGS. 9 and 10 are flowcharts showing an image processing method according to some example embodiments.

Referring to FIG. 9, one frame image may be divided into first to N-th slices, and first to N-th I-slices are desired and/or need to be transmitted to the image receiving device to represent the one picture during one I-frame period.

The compression operation is performed on the frame images in the at least one I-frame period. As an example, each of the frame images includes the first to N-th slices, and the compression operation is performed on each of the frame images in units of slices. First, the I-slice is generated by a first compression method with respect to a portion of slices of a first frame image in the first frame section of the I-frame period. In detail, the I-slice may be generated with respect to the first slice (S11). In addition, second to N-th slices of the first frame image may be compressed as the P-slice, and thus the P-slices may be generated with respect to the second to N-th slices (S12). When the I-slice and the P-slices are generated as described above, the packets including the I-slice and the P-slices are generated through the packetization process. As an example, a first packet including the first I-slice and a second packet including second to N-th P-slices may be generated (S13).

Meanwhile, the I-slices with respect to the second to N-th slices are distributed to and transmitted in other frame sections as other slices to represent the one picture (e.g., the reference frame). For instance, the I-slice may be generated with respect to the second slice of the second frame image (S14), and the P-slices may be generated with respect to the first and third to N-th slices as other slices of the second frame image (S15). When the I-slice and the P-slices are generated with respect to the second frame image as described above, a first packet including the second I-slice and a second packet including first and third to N-th P-slices may be generated (S16).

The above-mentioned process may further be performed in another frame section of one I-frame period. For instance, the I-slices with respect to the third to N-th slices may be distributed to another frame section while being transmitted.

Referring to FIG. 10, initial k frame sections of the initial I-frame period may be selected to desirably (and/or preferentially) transmit at least one reference frame when the video streaming starts (S21). Since the one frame image includes N slices, the number of the k frame sections is smaller than the number of the N slices. To allow the reference frame to be transmitted as fast as possible, one or two initial frame sections of the initial I-frame period may be selected.

In the selected k frame sections, N I-slices may be generated from k frame images to represent the one picture (S22). As an example, in a case in which one frame section is selected, the N I-slices may be generated from a first frame image. As another example, in a case in which two frame sections are selected, N/2 I-slices may be generated in the first frame image, and the remaining N/2 I-slices may be generated in a second frame image. According to at least one example embodiment, in a case in which all of the N I-slices are generated from one frame image, the compression ratio applied to the frame image may be set to have a large value.

The packetization operation may be performed on the I-slices generated as described above, and the N I-slices may be transmitted during the k frame sections (S23). Then, the P-slices may be generated from the remaining frame images of the initial I-frame period and transmitted to the image receiving device (e.g., the device request and/or receiving the video stream).

Then, as described above, the N I-slices used to represent the one picture may be distributed to the frame sections while being transmitted in the next I-frame period. According to at least one example embodiment, when one I-frame period includes M frame sections, N frame sections in which the I-slice is transmitted may be selected from M frame sections of the next I-frame period (S24). In this case, "M" may have a value greater than that of "N".

In the selected N frame sections, the compression operation may be performed on each frame image according to units of slices, and the I-slice and the P-slice may be generated together by the compression operation (S25). As an example, among the N slices, one slice may be compressed as the I-slice, and remaining N−1 slices may be compressed as the P-slices. In addition, when the compression operation is performed on the selected N frame images, slices positioned at different positions in the N frame images may be compressed as the I-slice.

According to the above-described example embodiment, the selected N frame sections may correspond to consecutive frame sections. As another example, the selected N frame sections may correspond to non-consecutive frame sections.

Meanwhile, the P-slices may be generated in remaining frame sections (e.g., M-N frame sections) of the next I-frame period (S26). For instance, the P-slices may be generated from each of M-N frame images.

Figure 11:
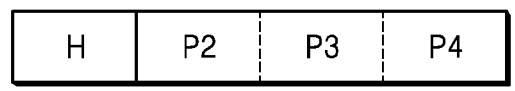
FIGS. 11 and 12 are views each showing an example of packets each including compressed slices according to at least one example embodiment.
Figure 11:
Figure 12:
Figure 12:
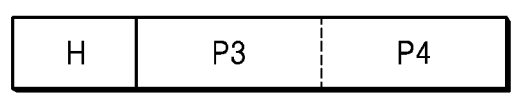
Figure 12:
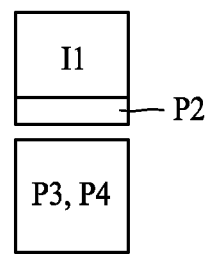

FIGS. 11 and 12 are views each showing an example of the packets each including the compressed slices according to some example embodiments. FIGS. 11 and 12 show packets to transmit the I-slice and the P-slices generated from one frame image.

The packetization operation may be performed by taking into account a size of the MTU. As an example, when assuming that the size of the MTU is restricted to (e.g., set to) about 1500 bytes, a type and a number of the slices included in the packet may be determined by taking into account the sizes of the I-slice, the P-slice, and a header. The packetizer according to at least one of the above-mentioned example embodiments may perform the packetization operation by allocating the I-slice and the P-slice, the I-slice and the P-slice being generated from the one frame image, to the packets in a number less than that of the slices included in the one frame image.

Referring to FIG. 11, one frame image may be divided into first to fourth slices, one slice (e.g., a first slice) among the first to fourth slices may be compressed as an I-slice I1, and the other slices (e.g., second to fourth slices) among the first to fourth slices may be compressed as P-slices P2, P3, and P4. In addition, the I-slice I1 and the P-slices P2, P3, and P4 may be transmitted together in the one frame section.

In the packetization operation performed on the I-slice I1 and the P-slices P2, P3, and P4, the P-slices P2, P3, and P4 may be included in one packet while being transmitted, and the I-slice I1 may be included in another packet while being transmitted. The packetization operation described above may be performed by taking into account the size of the MTU such that the size of the header and the size of the slice do not exceed the size of the MTU.

Meanwhile, referring to FIG. 12, the I-slice and the P-slice may be included together in one packet. In the case in which the first slice is compressed as the I-slice I1 and the second to fourth slices are compressed as the P-slices P2, P3, and P4 according to at least one example embodiment, the slices compressed in different ways in accordance with the size of each of the I-slice I1 and the P-slices P2, P3, and P4 may be included in the one packet.

For instance, in a case in which a sum of the size of at least one P-slice of the P-slices P2, P3, and P4, the size of the I-slice I1, and the size of the header corresponding to the P- and I-slices do not exceed the size of the MTU, the I-slice I1 and the at least one P-slice may be included in the one packet. In other words, the number of I-slices and P-slices included in a packet is based on the sizes of the I-slices, the P-slices, the packet header, and the maximum size of the packet. In FIG. 12, when the P-slice P2 obtained by compressing the second slice has a relatively small size compared to other P-slices, and the sum of the size of the I-slice I1, the size of the P-slice P2, and the size of the header corresponding to the P- and I-slices do not exceed the size of the MTU, the packetization operation may be performed such that the I-slice I1 and the P-slice P2 are included in one packet.

According to the packetization operation described above, the packet of one frame section (the section in which the I-slice is transmitted) of the graphs in the various example embodiments shown in FIGS. 6B to 8 may be represented as shown in FIG. 12. That is, at least one P-slice may be included in the packet including the I-slice, and a number and a position of the P-slices included in the packet including the I-slice may be changed in each frame section as described later.

Figure 13:
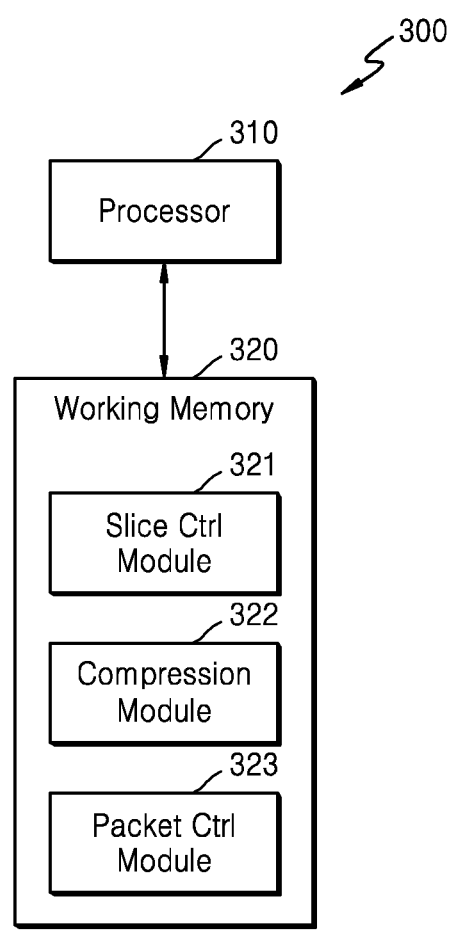
FIG. 13 is a block diagram showing an example in which an image processing method is implemented in software according to some embodiments.

FIG. 13 is a block diagram showing an example in which an image processing method is implemented in software according to at least one example embodiment.

Referring to FIG. 13, an image processing device 300 may include at least one processor 310 and a working memory 320. The processor 310 may execute programs stored in the working memory 320. The working memory 320 may store various programs for the slicing operation, the compression operation, and the packetization operation, etc., according to at least one of the above-mentioned example embodiments, and the programs may include a slice control module 321, a compression module 322, and a packet control module 323, etc., in accordance with a function thereof.

As an example, the processor 310 may control the overall image processing operations according to at least one example embodiment. For instance, the processor 310 may execute the slice control module 321 to divide the frame image into a plurality of slices. In addition, the processor 310 may execute the compression module 322 to perform the compression operation according to at least one of the above-described example embodiments on the frame image divided into a plurality of slices. For instance, among the slices associated with one frame image, the I-slices may be generated with respect to some of the slices of the frame image, and the P-slices may be generated with respect to other slices of the frame image. In addition, the slices used to represent one picture may be respectively compressed as the I-slices in different frame sections, and the frame image in which the I-slice is generated may be selected by executing the compression module 322.

In addition, the processor 310 may execute the packet control module 323 to control a packet generation operation. For instance, as described above, the I-slice or the P-slice may be included in the packet, or the packet may be configured to allow the I-slice and the P-slice to be included together in one packet, but the example embodiments are not limited thereto.

In the at least one example embodiment shown in FIG. 13, functions of the above-mentioned example embodiments are implemented in software in combination with hardware, but they are not limited thereto. For instance, one or more of the functions of the modules shown in FIG. 13 may be implemented in hardware.

Figure 14:
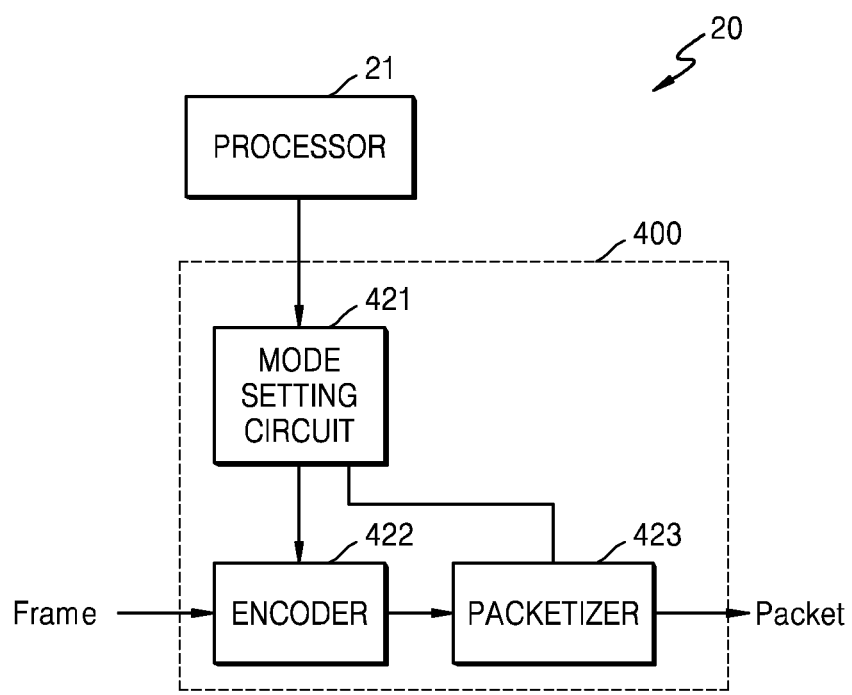
FIG. 14 is a block diagram showing an implemented example of an image processing device in which an image processing mode is set according to at least one example embodiment.

FIG. 14 is a block diagram showing an implemented example of an image processing device in which an image processing mode is set according to at least one example embodiment.

Referring to FIG. 14, an image processing device 400 may include a mode setting circuit 421, an encoder 422, and a packetizer 423, etc. The image processing device 400 may be provided in an image processing system 20 and controlled by at least one processor 21 in the image processing system 20. For instance, the mode setting circuit 421 may store various setting values associated with the image processing in response to the control by the processor 21, and an operation mode of each of the encoder 422 and the packetizer 423 may be controlled based on a setting value provided from the mode setting circuit 421, but the example embodiments are not limited thereto.

According to at least one example embodiment, the encoder 422 may perform an encoding operation including the compression operation according to at least one of the above-mentioned example embodiments based on control of the mode setting circuit 421. For instance, the I-slices corresponding to one picture may be generated to be distributed in different frame sections, and the frame sections in which the I-slices are generated may be selected based on the control of the mode setting circuit 421. In addition, the position of the slice, at which the I-slice is generated, may be selected with respect to each of the frame images.

For example, the packetizer 423 may perform the packet generation operation according to at least one of the above-mentioned example embodiments based on the control of the mode setting circuit 421. For instance, a packet selectively including only the I-slice or the P-slice or a packet including both the I-slice and the P-slice may be generated based on the control of the mode setting circuit 421, but the example embodiments are not limited thereto.

The image processing system 20 of FIG. 14 may correspond to various kinds of devices. For instance, the image processing system 20 may be a user device such as a terminal device, a computing device, a smart device, a wearable device, an Internet of Things (IoT) device, etc. As another example, the image processing system 20 may correspond to an application processor in which the processor 21 and an image processing device 400 are implemented in a chip as a CODEC.

Figure 15:
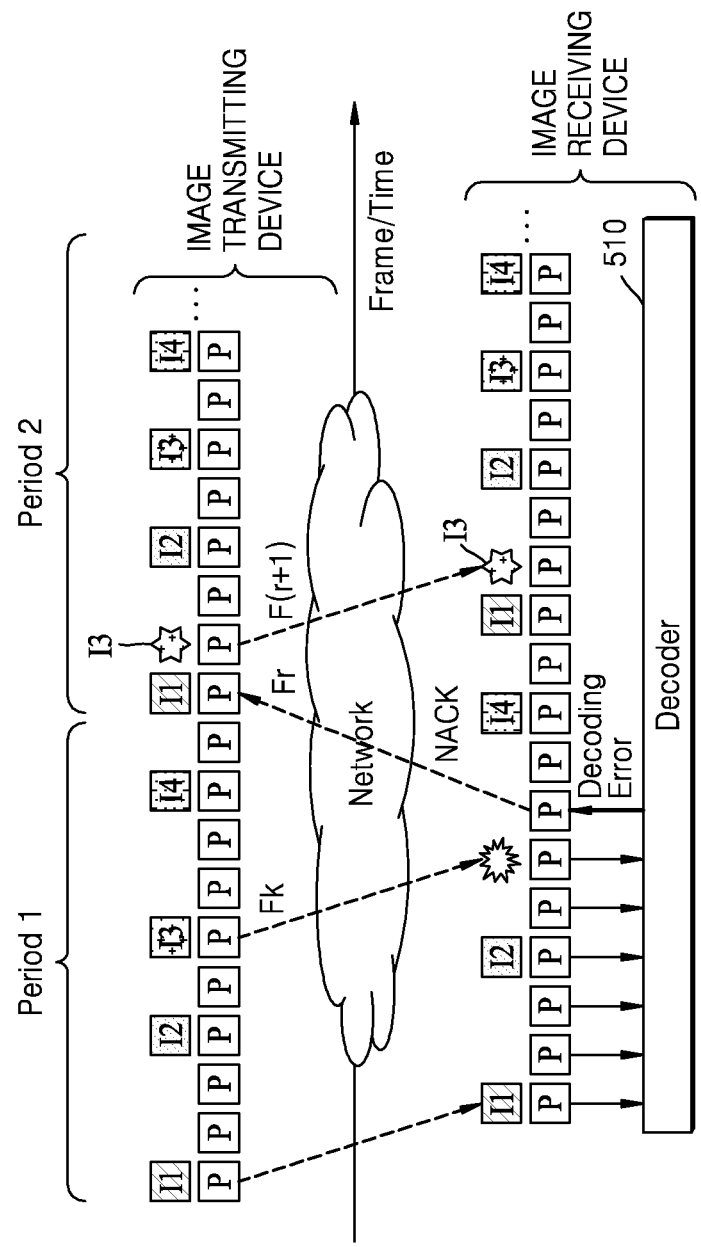
FIGS. 15 and 16 are views each showing an example of an error recovery operation in an image processing device according to at least one example embodiment.
Figure 16:
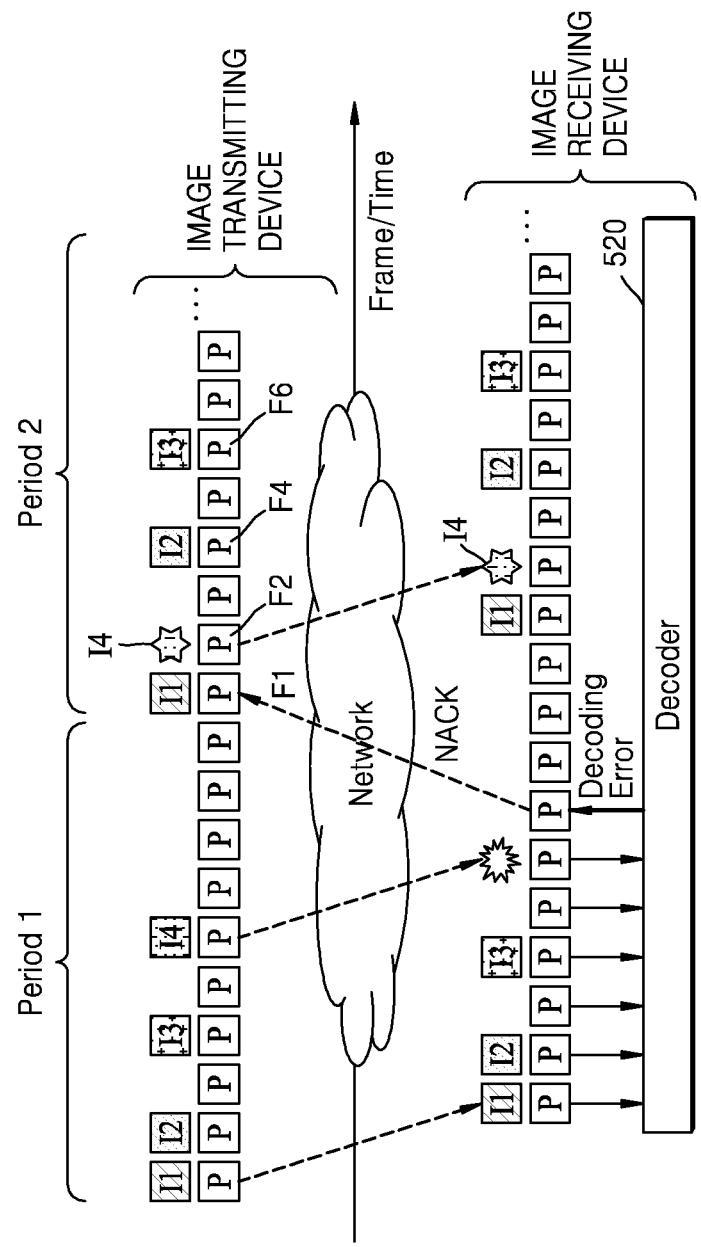

FIGS. 15 and 16 are views showing an example of an error recovery operation in an image processing device according to at least one example embodiment.

When the image receiving device fails to receive a packet or a decoding error occurs when decoding a received packet, the image receiving device may transmit a signal (e.g., an error signal), the signal indicates that a decoding error, such as an error that occurred during the decoding process and/or an error that occurred during the transmission/reception of a packet including data to be decoded, etc., has occurred in or related to a slice positioned at a specific position, to the image transmitting device for error recovery. In particular, when the decoding error occurs due to a failure of normal reception of the I-frame (or the I-slice), a probability of an error occurring in the decoding operation performed on frames (or slices) received after the I-frame increases. However, in the case of the conventional image transmission described above, the bandwidth of the network increases since all of the slices of the I-frame are compressed as the I-slices, and thus the probability of decoding error occurrence is still high even though the I-frame is again transmitted to the image receiving device.

According to at least one example embodiment, the image transmitting device may receive a signal NACK, indicating that a decoding error has occurred in a specific slice, from the image receiving device, generate the I-slice (e.g., re-generate and/or select the previously generated I-slice) with respect to the specific slice in response to the signal NACK, and transmit (e.g., re-transmit) the I-slice with respect to the specific slice to the image receiving device. That is, the image transmitting device may selectively compress the slice positioned at the specific position of the frame image as the I-slice in response to the signal NACK. Referring to FIG. 15, it is assumed that first to fourth I-slices I1 to I4 used to represent one picture are distributed to frame sections while being transmitted, and the decoding error has occurred in the third I-slice I3 transmitted in one frame section Fk of a first I-frame period Period 1, but the example embodiments are not limited thereto.

When a decoder 510 provided in the image receiving device determines that the decoding error has occurred in the third I-slice I3, the decoder 510 transmits the signal NACK indicating that the occurrence of the decoding error to the image transmitting device. As an example, the image transmitting device receives the signal NACK in one frame section Fr of a second I-frame period Period 2, and the image transmitting device may compress the third slice as the I-slice I3 in one frame section after the frame section Fr.

As an example, the first to fourth I-slices I1 to I4 (e.g., the plurality of I-slices) may be distributed to and transmitted in the frame sections during the second I-frame period Period 2, and the image transmitting device may generate and transmit the third I-slice I3 in a frame section F(r+1) which is next to the frame section Fr in which the signal NACK is received. According to at least one example embodiment, during the second I-frame period Period 2, the I-slice (e.g., the third I-slice I3) identified in the signal NACK may be additionally generated (e.g., re-generated and/or the previously generated I-slice may be selected from a memory, such as a cache) and transmitted in response to the signal NACK separately from the frame sections in which the first to fourth I-slices I1 to I4 are transmitted. That is, the frame section F(r+1) corresponds to a section in which the P-slices are transmitted, but the image transmitting device may transmit the third I-slice I3 in the frame section F(r+1) in response to the signal NACK.

Although not shown in FIG. 15, in a case in which the frame section F(r+1) corresponds to the frame section in which one I-slice is transmitted, the image transmitting device may additionally transmit the third I-slice I3 in one frame section in which the I-slice is not transmitted among the frame sections after the frame section F(r+1). Or in other words, the image transmitting device may re-transmit the third I-slice I3 in a frame section where no other I-slices are scheduled to be transmitted.

Meanwhile, according to at least one example embodiment shown in FIG. 16, an image transmitting device may change a transmission order of first to fourth I-slices I1 to I4 in response to a signal NACK indicating that a decoding error has occurred. For instance, if the decoder 520 provided in an image receiving device determines that the decoding error has occurred in the fourth I-slice I4 and transmits the signal NACK to the image transmitting device, and the image transmitting device receives the signal NACK in a first frame section F1 of the second I-frame period Period 2, and the image transmitting device may transmit the first to fourth I-slices I1 to I4 in some frame sections of the second I-frame period Period 2. As an example, the image transmitting device may transmit the first to fourth I-slices I1 to I4 in first, second, fourth, and sixth frame sections F1, F2, F4, and F6. In a case in which the decoding error does not occur, the second I-slice I2 may be transmitted in the second frame section F2, but the image transmitting device may transmit (desirably and/or preferentially) the fourth I-slice I4, in which the decoding error occurs in the previous example, to the second frame section F2 in response to the signal NACK. In addition, remaining I-slices I2 and I3 may be transmitted in the fourth and sixth frame sections F4 and F6.

According to the at least one example embodiment shown in FIG. 16, the decoding error may be properly handled without increasing the number of times the I-slice is transmitted in one I-frame period. That is, since the specific I-slice in which the decoding error occurs is transmitted prior to the other I-slices, a decoding performance of the image receiving device may be maintained, prevented from deteriorating, and/or the deterioration of the decoding performance is lessened.

Figure 17:
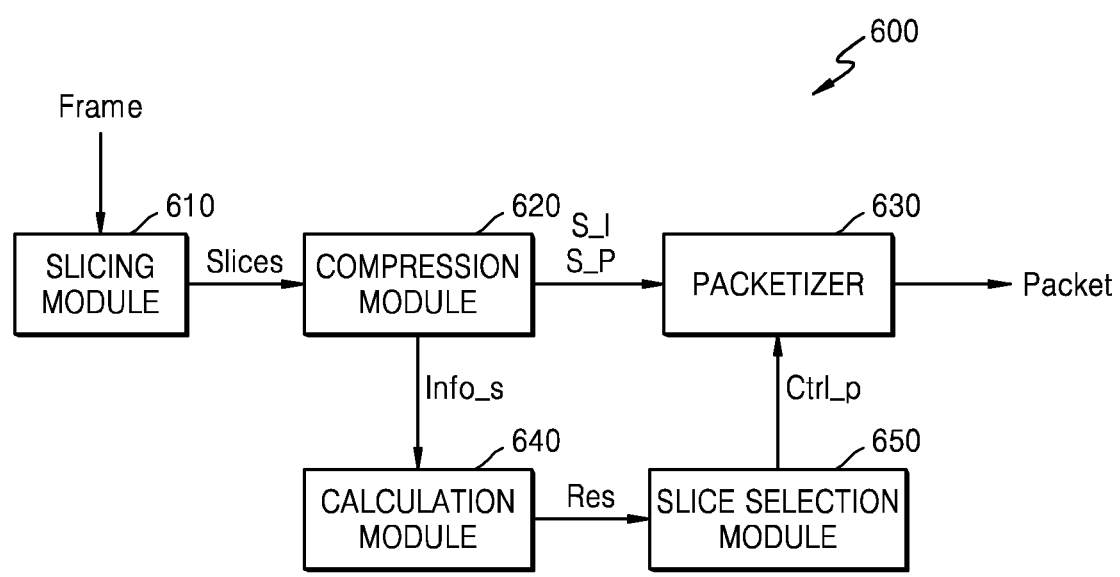
FIGS. 17 and 18 are views each showing an example of selecting slices which are to be included in one packet according to some example embodiments.
Figure 18:
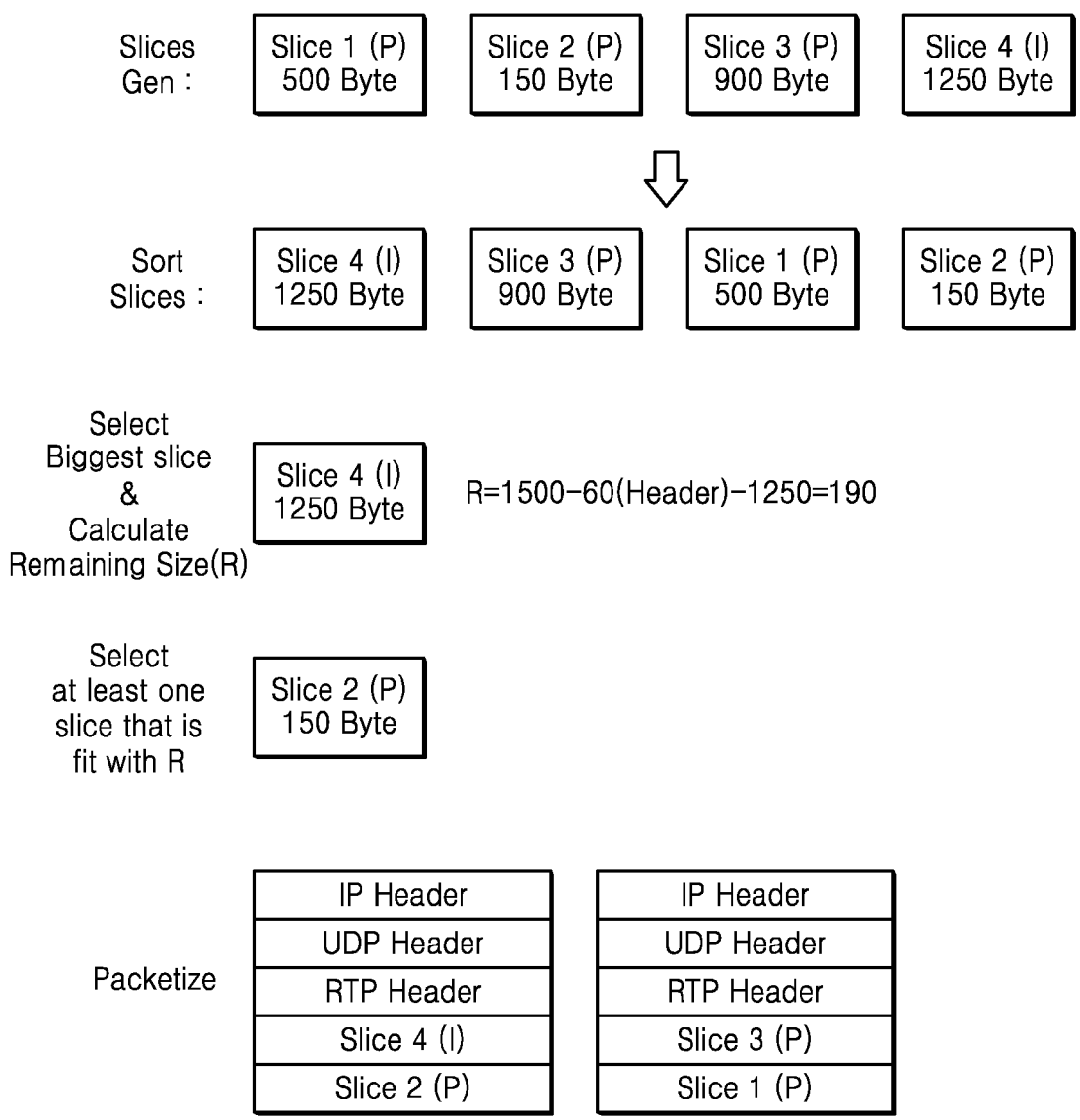

FIGS. 17 and 18 are views showing an example of selecting slices which are to be included in one packet according to at least one example embodiment.

Referring to FIG. 17, an image processing device 600 may include a slicing module 610, a compression module 620, a packetizer 630, a calculation module 640, and a slice selection module 650, etc., but is not limited thereto. Similar to at least one of the above-mentioned example embodiments, various modules provided in the image processing device 600 may be implemented in hardware, or a combination of hardware and software. In addition, the calculation module 640 and the slice selection module 650 are provided separately from each other, but functions of the modules may be implemented in a single module.

The slicing module 610 receives a frame image Frame and divides the frame image Frame into a plurality of slices Slices. The compression module 620 generates an I-slice S_I and a P-slice S_P as in at least one of the above-described example embodiments. According to at least one example embodiment, the I-slice S_I and the P-slice S_P may be generated together in one frame image Frame. In addition, the packetizer 630 may generate a packet including one or more slices, and the I-slice S_I and/or the P-slice S_P may be included in the packet. As another example, the I-slice S_I and the P-slice S_P may be included together in the packet.

The compression module 620 may further generate information Info_s associated with a size of the generated I-slice S_I and a size of the generated P-slice S_P and provide the generated information Info_s to the calculation module 640. The calculation module 640 may perform a calculation operation based on the information Info_s and provide the calculated result Res to the slice selection module 650. The slice selection module 650 may select slices to be included in the one packet based on the calculated result Res and provide a control signal Ctrl_p to the packetizer 630 to control a packet generation operation based on the selected result.

Hereinafter, an example of the operation according to components shown in FIG. 17 will be described with reference to FIG. 18 according to at least one example embodiment.

The compression operation may be performed on the first to fourth slices Slice 1 to Slice 4 by the compression module 620. The first to third slices Slice 1 to Slice 3 may be compressed as the P-slice, and the fourth slice Slice 4 may be compressed as the I-slice as a result of the compression operation, but the example embodiments are not limited thereto. As an example, the first to third slices Slice 1 to Slice 3 compressed as the P-slice have sizes of about 500 bytes, about 150 bytes, and about 900 bytes, respectively, and the fourth slice Slice 4 compressed as the I-slice has a size of about 1250 bytes, but the slice sizes will vary based on the image data included in the individual slices and the compression algorithm used.

The calculation operation may be performed by the calculation module 640 using the sizes of the slices. As an example, a sorting operation may be performed based on the sizes of the compressed first to fourth slices Slice1 to Slice 4 to sort the slices by size, and a calculation may be performed using the fourth slice Slice 4 compressed as the I-slice having the largest size and the size of the MTU defined by a desired and/or predetermined value. For instance, a remaining size R for a packet to be transmitted may be calculated by subtracting the header size of the packet and the size of the fourth slice Slice 4 from about 1500 bytes corresponding to the size of the MTU. In FIG. 18, the remaining size R may be calculated to be about 190 bytes.

Then, it is determined whether the remaining size R is calculated to have a positive (+) value through the calculation operation using the remaining size R and the size of other slices. For instance, the size of the third slice Slice 3 having the second greatest value may be subtracted from the remaining size R of about 190 bytes previously calculated, and in this case, the remaining size R is calculated to have a negative (−) value. Through the calculation operation, the slice (e.g., the second slice Slice 2) may be selected such that the remaining size R is calculated to have the positive (+) value.

After the fourth slice Slice 4 and the second slice Slice 2 are selected, it is determined whether adding another slice to the packet would allow the remaining size R to be calculated to have the positive (+) value exists through the calculation operation. In the at least one example embodiment shown in FIG. 18, the remaining slices are too large and another slice allowing the remaining size R to be calculated to have the positive (+) value does not exist.

When the calculated result Res is provided to the slice selection module 650, the slice selection module 650 determines that the fourth slice Slice 4 and the second slice Slice 2 may be included in one packet and provides the control signal ctrl_p indicating that the fourth slice Slice 4 and the second slice Slice 2 may be included in one packet to the packetizer 630. In addition, the slice selection module 650 determines that the third slice Slice 3 and the first slice Slice 1 may be included in one packet and provides the control signal ctrl_p indicating that the third slice Slice 3 and the first slice Slice 1 may be included in one packet to the packetizer 630. The packetizer 630 may generate the packet including the fourth and second slices Slice 4 and Slice2 and the packet including the third and first slices Slice 3 and Slice 1.

With reference to the packet generation result shown in FIG. 18, each packet may include one or more slices and a variety of information in accordance with a protocol applied to the packet. As an example, an IP header, an UDP (User Datagram Protocol) header, and an RTP (Real Time Protocol) header, etc., are included in the packet, but the example embodiments should not be limited thereto. That is, header information according to other various transmission protocols may be included in the packet.

FIGS. 19A, 19B, 20A, and 20B are views showing other examples of selecting slices which are to be included in one packet according to some example embodiments.

Figure 19A:
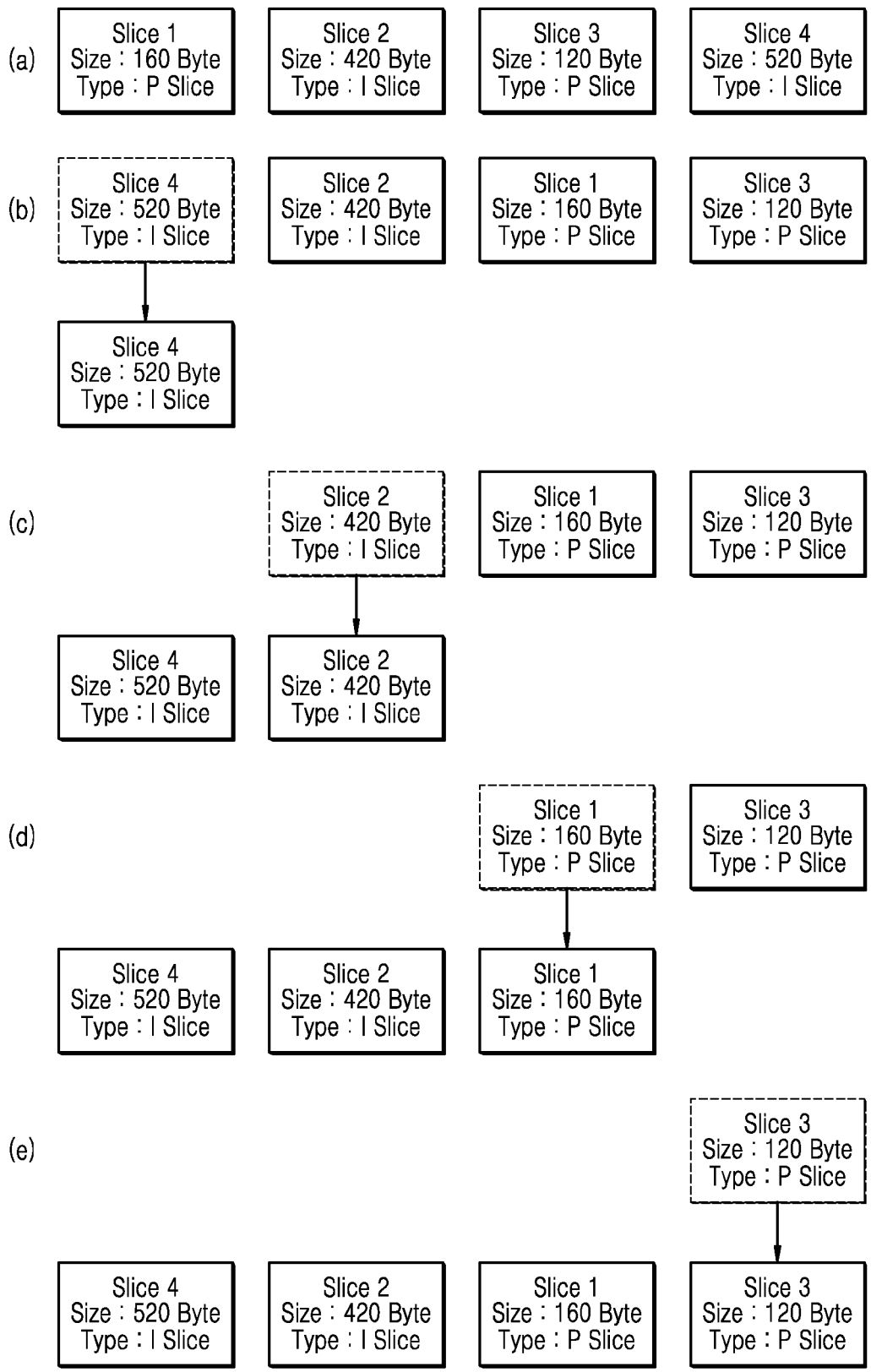
FIGS. 19A, 19B, 20A, and 20B are views each showing other examples of selecting slices which are to be included in one packet according to some example embodiments.

Referring to FIG. 19A, as an example of the compression result, the second and fourth slices Slice 2 and Slice 4 may be compressed as the I-slice, and the first and third slices Slice 1 and Slice 3 may be compressed as the P-slice. In addition, as an example, the first, second, third, and fourth slices Slice1, Slice2, Slice 3, and Slice 4 shown in (a) of FIG. 19A have sizes of about 160 bytes, about 420 bytes, about 120 bytes, and about 520 bytes, respectively.

In addition, as in at least one of the above-described example embodiments, the sorting operation may be performed on the first to fourth slices Slice 1 to Slice 4 as shown in (b) of FIG. 19A, and the calculation may be performed using the size of each slice in order of size beginning with the largest with respect to the first to fourth slices Slice 1 to Slice 4. For instance, the calculation may be performed using the size (e.g., about 1500 bytes) of the MTU, the header size (e.g., about 60 bytes), and the sizes of the first to fourth slices Slice 1 to Slice 4, and the remaining size R may be calculated. For instance, as shown in (b), the remaining size R may be calculated through the calculation performed using the fourth slice Slice 4, and the fourth slice Slice 4 may be selected as a slice to be included in the packet based on the calculated result.

In addition, as shown in (c), the calculation may be performed using the second slice Slice 2 having the second largest size, and the second slice Slice 2 may further be selected as a slice to be included in the packet. As shown in (d), the calculation may be performed using the first slice Slice 1 having the third largest size, and the first slice Slice 1 may further be selected as a slice to be included in the packet. As shown in (e), the calculation may be performed using the third slice Slice 3 having the smallest size, and the third slice Slice 3 may further be selected as a slice to be included in the packet since the remaining size R may be calculated as having the positive (+) value through the calculation result using the third slice Slice 3. Accordingly, all of the first to fourth slices Slice 1 to Slice 4 may be included in one packet based on the sizes of the slices and the size of the packet. Further, while the sorting operation and the calculation operation occurred on a largest slice size to smallest slice size order, the example embodiments are not limited thereto and any other order may be used.

Figure 19B:
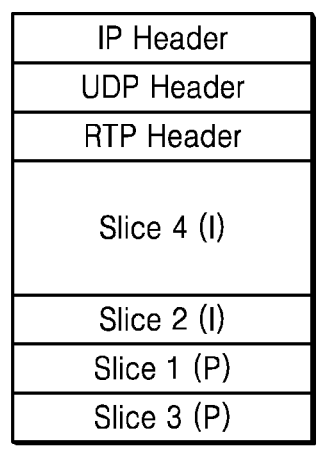

FIG. 19B shows one packet including the first to fourth slices Slice 1 to Slice 4 together with the IP header, the UDP header, and the RTP header according to at least one example embodiment.

Figure 20A:
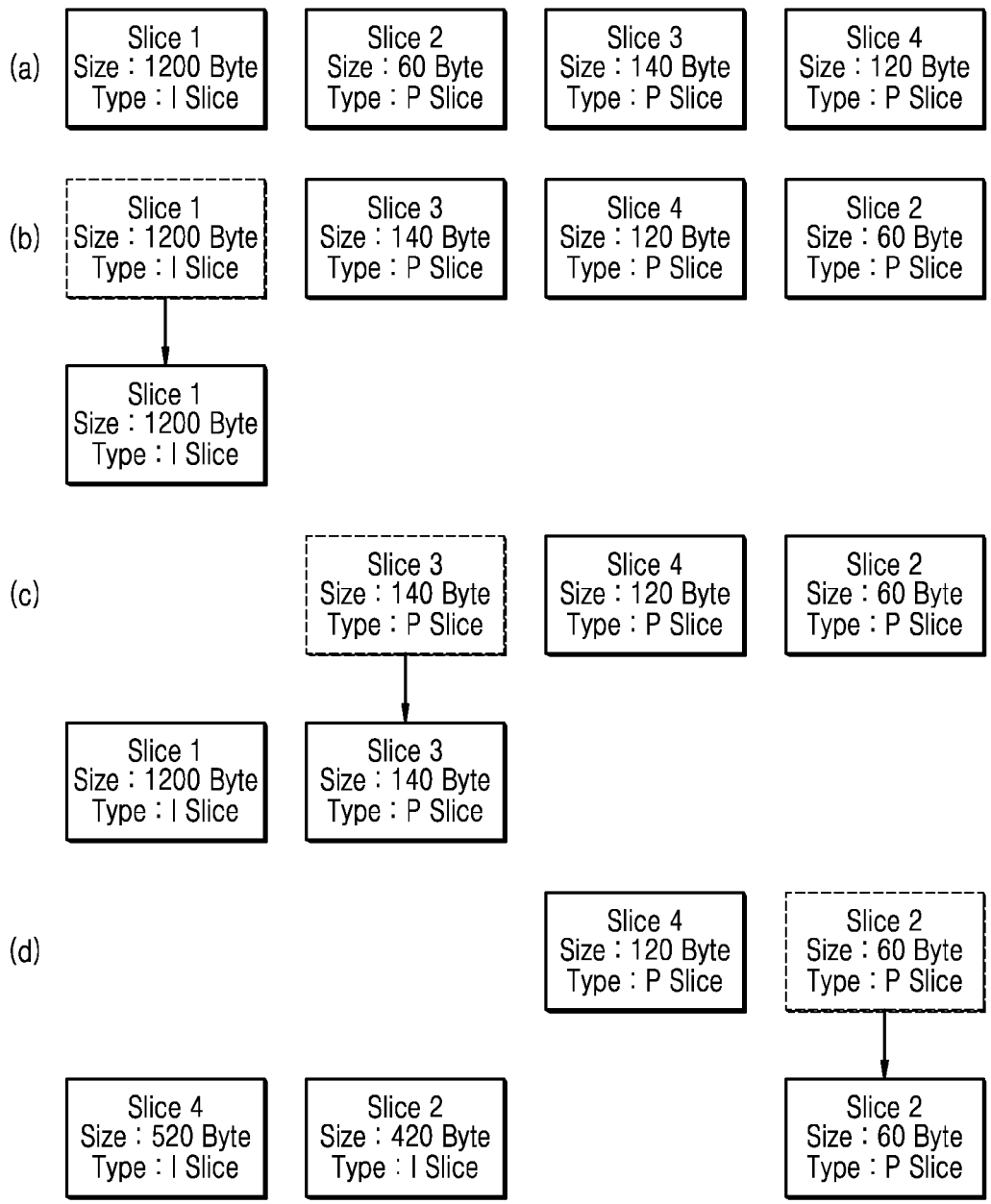

Meanwhile, referring to FIG. 20A, as an example of the compressed result, the first slice Slice 1 may be compressed as the I-slice, and the second to fourth slices Slice 2 to Slice 4 may be compressed as the P-slice. In addition, as an example, the first, second, third, and fourth slices Slice1, Slice2, Slice 3, and Slice 4 shown in (a) of FIG. 20A have sizes of about 1200 bytes, about 60 bytes, about 140 bytes, and about 120 bytes, respectively.

Similar to at least one of the above-mentioned example embodiments, the sorting operation may be performed on the first to fourth slices Slice 1 to Slice 4 as shown in (b) of FIG. 20A, and the calculation may be performed using the size (e.g., about 1500 bytes) of the MTU, the header size (e.g., about 60 bytes), and the sizes of the first to fourth slices Slice 1 to Slice 4. First, the calculation may be performed using the first slice Slice 1 having the largest size, and the first slice Slice1 may be selected as a slice to be included in the packet based on the calculated result.

In addition, as shown in (c), the calculation may be performed using the third slice Slice 3 having the second largest size, and the third slice Slice 3 may further be selected as a slice to be included in the packet. Then, the calculation may be performed using the fourth slice Slice 4 having the third largest size, and in this case, the remaining size R may be calculated as having the negative (−) value through the calculation result using the fourth slice Slice 4. Accordingly, the fourth slice Slice 4 is not selected as the slice to be included in the same packet as the first and third slices Slice 1 and Slice 3 as shown in (d).

Figure 20B:
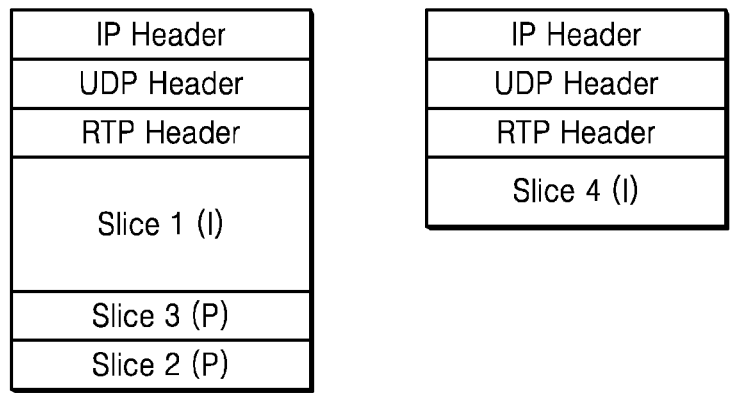

Meanwhile, the calculation may further be performed using the second slice Slice2, and the remaining size R may be calculated as having the positive (+) value based on the calculation result. Accordingly, the second slice Slice 2 may further be selected as a slice to be included in the packet. Referring to FIG. 20B, the IP header, the UDP header, and the RTP header may be included in the same packet together with the previously selected first to third slices Slice 1 to Slice 3. Additionally, the fourth slice Slice 4 that is not selected in the above-mentioned process may be included in a separate packet.

According to at least one example embodiment, some slices among the slices may be selected through the calculation process, and the above-mentioned calculation process may further be performed on remaining slices that are not selected, thereby selecting the slice to be included in one packet. In a case that the first and second slices Slice 1 and Slice 2 among the first to fourth slices Slice 1 to Slice 4 are selected as slices to be included in the same packet, the calculation operation may be performed again on the third and fourth slices Slice 3 and Slice 4 using the size (e.g., about 1500 bytes) of the MTU and the header size (e.g., about 60 bytes). Then, when the selection process is completed on all of the slices, one or more packets may be generated based on the selected result.

Figure 21:
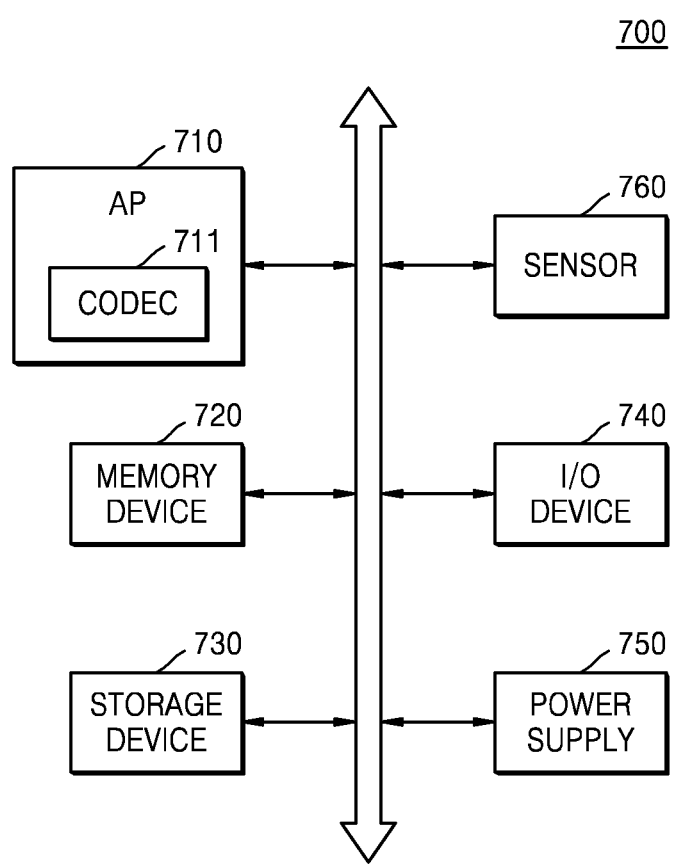
FIG. 21 is a block diagram showing a computing system including an image processing device according to some example embodiments.

FIG. 21 is a block diagram showing a computing system 700 including an image processing device according to at least one example embodiment.

Referring to FIG. 21, the computing system 700 may include at least one processor 710, a memory device 720, a storage device 730, an input/output (I/O) device 740, a power supply 750, and an image sensor 760, etc., but is not limited thereto. Although not shown in FIG. 21, the computing system 700 may further include ports communicating with a video card, a sound card, a memory card, a USB device, and/or other electronic devices.

The processor 710 may be an application processor implemented in a System on Chip (SoC). The processor 710 may perform certain calculations and tasks. According to embodiments, the processor 710 may include a microprocessor, a central processing unit (CPU), and the like. The processor 710 may communicate with the memory device 720, the storage device 730, and the I/O device 740 via an address bus, a control bus, and a data bus.

The memory device 720 may store data required for an operation of the computing system 700. For instance, the memory device 720 may be implemented by a Dynamic Random Access Memory (DRAM), a mobile DRAM, a Static Random Access Memory (SRAM), a flash memory, a Phase-change Random Access Memory (PRAM), a Ferroelectric Random Access Memory (FRAM), Resistive Random Access Memory (RRAM) and/or a Magnetoresistive Random Access Memory (MRAM), etc. The storage device 730 may include a solid state drive (SSD), a hard disk drive (HDD), and/or a Blu-ray/DVD/CD-ROM drive. The I/O device 740 may include an input device, such as a keyboard, a keypad, a mouse, a microphone, a camera, etc., and an output device, such as a printer, a display, a speaker, etc. The power supply 750 may supply an operation voltage required for the operation of the computing system 700.

The function of performing the compression operation according to the embodiments may be performed by a CODEC module 711 of the processor 710, and the CODEC module 711 may perform the image compression operation and the packetization operation according to at least one of the above-described example embodiments. As an example, the CODEC module 711 may receive a frame image generated by the image sensor 760, process the received frame image to generate I-slices and P-slices, and transmit a packet including the generated I-slices and P-slices to an external device.

While the present inventive concepts have been described in connection with what is presently considered to be practical example embodiments, it is to be understood by those who skilled in the art that the inventive concepts are not limited to the disclosed example embodiments, but, on the contrary, are intended to cover various modifications, substitutions, and equivalent arrangements included within the spirit and scope of the appended claims. The previous example embodiments may be constructed and/or utilized independently or in combination with any other example embodiment contained herein. Therefore, the disclosed subject matter should not be limited to any single example embodiment described herein, and the above-described example embodiments are to be considered illustrative and not restrictive. Accordingly, the scope of the present inventive concepts shall be determined only according to the attached claims.

As is traditional in the field of the inventive concepts, various example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar processing devices, they may be programmed using software (e.g., microcode) to perform various functions discussed herein and may optionally be driven by firmware and/or software, thereby transforming the microprocessor or similar processing devices into a special purpose processor. Additionally, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

What is claimed is:

1. An image processing method comprising:
generating, using at least one processor, at least one I-slice by applying a first compression method to at least one slice of a first frame image comprising first to N-th slices, where N is an integer of 2 or greater;
generating, using the at least one processor, a plurality of P-slices by applying a second compression method to the other slices of the first frame image;
generating, using the at least one processor, a first packet, the first packet including at least one P-slice selected from the generated plurality of P-slices and a first generated I-slice of the generated at least one I-slice, and
transmitting, using the at least one processor, less than N packets to an image receiving device with respect to the first frame image, the less than N packets comprising the first packet,
wherein a size of the first packet is smaller than a maximum transmission packet size.

2. The method of claim 1, wherein
the first compression method is a compression method performed without reference to a slice of a previous frame image; and
the second compression method is a compression method performed with reference to at least one slice of one or more previous frame images.

3. The method of claim 1, further comprising:
generating, using the at least one processor, one I-slice and N−1 P-slices from a second frame image; and
transmitting, using the at least one processor, less than N packets to the image receiving device with respect to the second frame image comprises,
generating a first packet of the second frame image comprising the one I-slice of the second frame image,
generating a second packet of the second frame image comprising the N−1 P-slices, and
transmitting the first packet of the second frame image and the second packet of the second frame image to the image receiving device.

4. The method of claim 1, wherein
one I-slice and N−1 P-slices are generated from the first frame image, the one I-slice being the first generated I-slice; and
the transmitting less than N packets comprises generating the first packet comprising the one I-slice and the selected at least one P-slice, and generating a second packet comprising the remaining P-slices, and
transmitting the first packet and the second packet to the image receiving device.

5. The method of claim 1, wherein the I-slice is generated by the first compression method applied to the first slice, and the plurality of P-slices are generated by the second compression method applied to each of the second to N-th slices.

6. The method of claim 5, further comprising:
generating, using the at least one processor, at least one I-slice with respect to a second slice of a second frame image, the second frame image comprising first to N-th slices; and
generating, using the at least one processor, at least one P-slice with respect to each of the first slice and third to N-th slices of the second frame image.

7. The method of claim 1, further comprising:
generating, using the at least one processor, a P-slice with respect to each of first to N-th slices of a second frame image, the second frame image comprising the first to N-th slices.

8. The method of claim 1, further comprising:
setting, using the at least one processor, an I-frame period, during which I slices with respect to all slices are included in one frame image are transmitted, the I-frame period comprising M frame sections, where M is an integer greater than N, each of the M frame sections including frame images to be transmitted;
generating, using the at least one processor, the I-slices used to represent the one frame image; and
distributing, using the at least one processor, the I-slices among the M frame sections.

9. The method of claim 8, wherein the distributing the I-slices includes distributing the I-slices in N consecutive frame sections among the M frame sections.

10. The method of claim 8, wherein the distributing the I-slices includes distributing the I-slices in N non-consecutive frame sections among the M frame sections.

11. The method of claim 1, further comprising:
setting, using the at least one processor, an I-frame period, during which I slices with respect to all slices are included in one frame image are transmitted, the I-frame period comprising M frame sections, where M is an integer greater than N, each of the M frame section including frame images to be transmitted;
generating, using the at least one processor, the I-slices from initial k frame images of an initial I-frame period, where k is an integer smaller than N; and
transmitting, using the at least one processor, the I-slices during the M frame sections corresponding to the k frame images.

12. The method of claim 1, wherein the generating the first packet comprises:
performing, using the at least one processor, a calculation using a size of the generated I-slice and sizes of the generated plurality of P-slices; and
selecting, using the at least one processor, the at least one P-slice to be included in the first packet based on a result of the calculation and the maximum transmission packet size.

13. The method of claim 1, further comprising:
receiving, using the at least one processor, a signal indicating a failure of a decoding operation with respect to the first slice compressed as the I-slice;
generating, using the at least one processor, an I-slice with respect to a first slice of a second frame image that is to be transmitted subsequently; and
generating, using the at least one processor, P-slices with respect to remaining slices of the second frame image.

14. An image processing method, in which one frame image comprises N slices, where N is an integer of 2 or greater, and in which a period, during which I-slices associated with the N slices are transmitted, the method comprising:
selecting, using at least one processor, N frame sections among a plurality of frame sections included in the period;
generating, using the at least one processor, the I-slices associated with the N slices;
distributing, using the at least one processor, the generated I-slices in the selected N frame sections; and
generating, using the at least one processor, a first packet and a second packet, the first packet including one of the generated I-slices, and the second packet including a plurality of P-slices in each of the selected N frame sections, wherein
one I-slice and N−1 P-slices are generated in each of the selected N frame sections, and the first packet comprises the one I-slice and at least one P-slice, and
a size of the first packet is smaller than a maximum transmission packet size.

15. The method of claim 14, wherein a number of the packets generated in each of the selected N frame sections is greater than a number of packets generated in the frame sections that are not selected among the frame sections.

16. The method of claim 14, wherein the second packet comprises the remaining P-slices among the N−1 P-slices except for the P-slice included in the first packet.

17. The method of claim 14, further comprising:
generating, using the at least one processor, P-slices with respect to N slices included in one frame image in each of the frame sections that are not selected among the frame sections; and
transmitting, using the at least one processor, a packet comprising the N P-slices.

18. The method of claim 14, wherein the N frame sections are non-consecutively positioned in the period.

19. An image processing method comprising:
generating, using at least one processor, at least one I-slice by applying a first compression method to at least one slice of a first frame image comprising first to N-th slices, where N is an integer of 2 or greater;
generating, using the at least one processor, a plurality of P-slices by applying a second compression method to the other slices of the first frame image; and
transmitting, using the at least one processor, less than N packets to an image receiving device, the less than N packets comprising the generated at least one I-slice and the generated P-slices with respect to the first frame image,
wherein,
one I-slice and N−1 P-slices are generated from the first frame image, and
the transmitting of less than N packets comprises,
generating a first packet comprising the one I-slice and generating a second packet comprising all of the N−1 P-slices, and
transmitting the first packet and the second packet to the image receiving device.

* * * * *